US012299735B2

(12) United States Patent
Jhunjhunwala et al.

(10) Patent No.: US 12,299,735 B2
(45) Date of Patent: May 13, 2025

(54) SYSTEMS AND METHODS FOR REMOTELY PURCHASING PERISHABLE PRODUCTS

(71) Applicant: Walmart Apollo, LLC, Bentonville, AR (US)

(72) Inventors: Amit Jhunjhunwala, Bangalore (IN); Rahul Kumar, Bangalore (IN); Mangesh N. Kulkarni Wadhonkar, Hyderabad (IN); Parul Aggarwal, Samrala (IN)

(73) Assignee: Walmart Apollo, LLC, Bentonville, AR (US)

( * ) Notice: Subject to any disclaimer, the term of this patent is extended or adjusted under 35 U.S.C. 154(b) by 379 days.

(21) Appl. No.: 17/863,133

(22) Filed: Jul. 12, 2022

(65) Prior Publication Data
US 2023/0011553 A1    Jan. 12, 2023

Related U.S. Application Data

(60) Provisional application No. 63/220,731, filed on Jul. 12, 2021, provisional application No. 63/220,723, filed on Jul. 12, 2021.

(51) Int. Cl.
G06Q 30/00        (2023.01)
G06Q 10/087       (2023.01)
(Continued)

(52) U.S. Cl.
CPC ....... *G06Q 30/0643* (2013.01); *G06Q 10/087* (2013.01); *G06T 3/4038* (2013.01); *G06T 7/10* (2017.01); *G06V 20/68* (2022.01)

(58) Field of Classification Search
CPC .... G06Q 30/0643; G06Q 10/087; G06T 7/10; G06T 3/4038; G06V 20/68
(Continued)

(56) References Cited

U.S. PATENT DOCUMENTS 9,827,683 B1    11/2017    Hance
9,852,394 B1    12/2017    Rouaix
(Continued)

FOREIGN PATENT DOCUMENTS

CN        111415223        7/2020

OTHER PUBLICATIONS

Global IP News: "United States Patent for Out of Stock Item Tracking at Retail Sales Facilities Issued to Walmart Apollo," Business and Commerce Patent News [New Delhi] Feb. 19, 2019.; Dialog # 2183685139, 2pgs. (Year: 2019).*

*Primary Examiner* — Robert M Pond
(74) *Attorney, Agent, or Firm* — Foley IP Law, PLLC

(57) ABSTRACT

In some embodiments, a system for remotely purchasing perishable products includes a plurality of image capture devices configured to capture images of perishable products, a product image database, a product attribute database, and a control circuit configured to execute computer program modules. An image processing module receives and processes images from the image capture devices to form a composite image. A product identification module identifies and segments the products in the composite image. A product selection module causes an application executed on a remote electronic device operated by a customer to display the composite image and receives from the application a selection of a product to purchase, at least one product attribute, and a quantity of individual product units to purchase. The product selection module identifies the individual product units having the selected product attribute(s) and outputs signaling to cause retrieval of the individual product units.

19 Claims, 8 Drawing Sheets

(51) Int. Cl.
  *G06Q 30/0601*  (2023.01)
  *G06T 3/4038*  (2024.01)
  *G06T 7/10*  (2017.01)
  *G06V 20/68*  (2022.01)

(58) Field of Classification Search
  USPC .................................................. 705/26, 27
  See application file for complete search history.

(56) References Cited

U.S. PATENT DOCUMENTS

| | | |
|---|---|---|
| 10,055,645 B1 | 8/2018 | Madan |
| 10,176,452 B2 * | 1/2019 | Rizzolo ................ G01C 21/206 |
| 10,290,047 B1 | 5/2019 | Goyal |
| 10,614,513 B2 | 4/2020 | Dollens |
| 10,757,861 B2 | 9/2020 | Robertson |
| 10,949,799 B2 * | 3/2021 | Chaubard ............. H04N 23/57 |
| 11,768,030 B2 * | 9/2023 | Avakian ............... G06Q 10/087 62/126 |
| 2017/0032311 A1 * | 2/2017 | Rizzolo ................. G06V 10/25 |
| 2018/0134492 A1 | 5/2018 | Lert, Jr. |
| 2018/0218469 A1 | 8/2018 | Lert, Jr. |
| 2018/0374144 A1 | 12/2018 | Smilowitz |
| 2020/0005225 A1 * | 1/2020 | Chaubard ........... H04N 23/698 |
| 2020/0017303 A1 | 1/2020 | Grosse |
| 2020/0302510 A1 * | 9/2020 | Chachek ............ G06Q 30/0639 |
| 2021/0182930 A1 * | 6/2021 | Yee ........................ G06F 3/014 |

\* cited by examiner

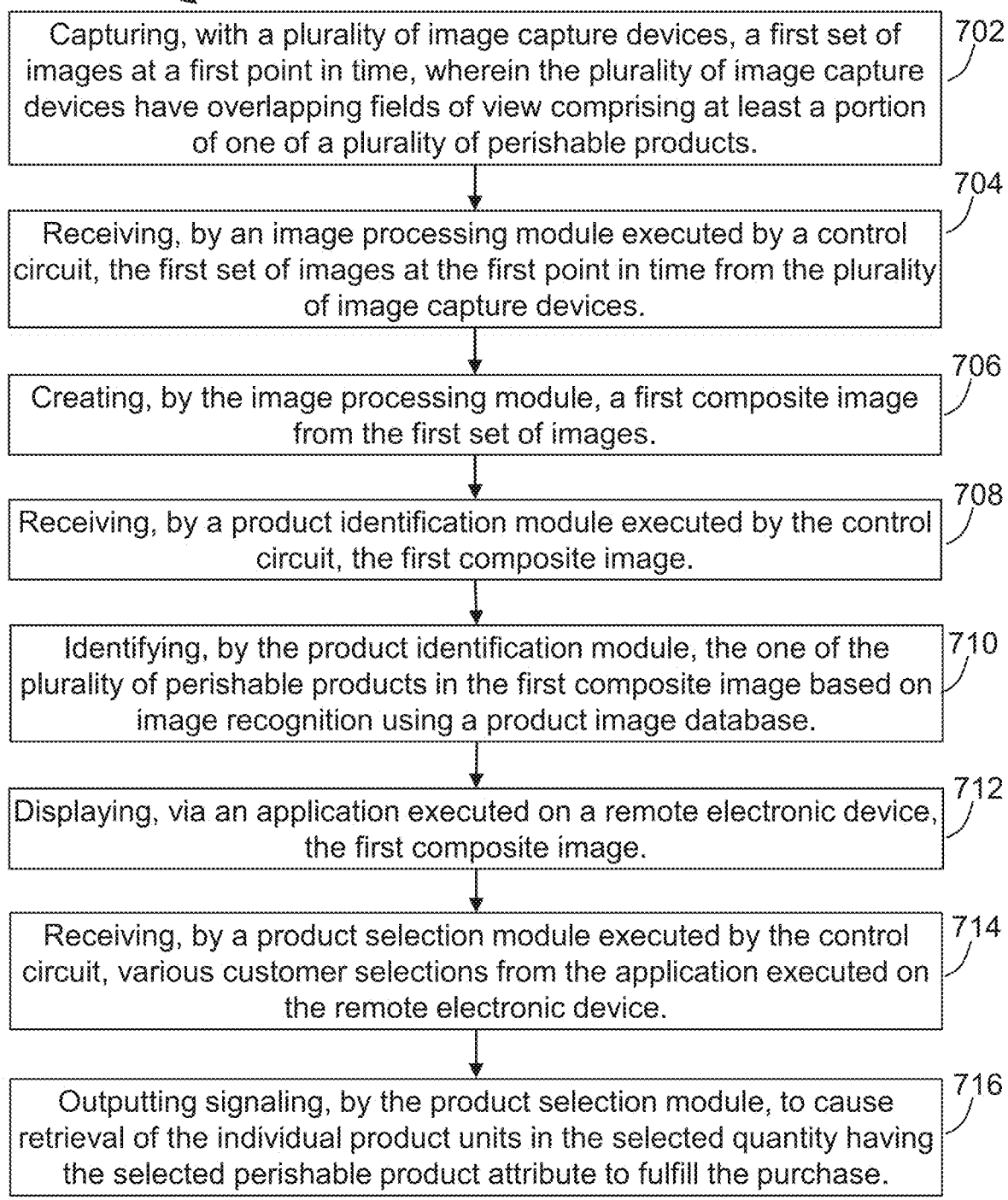

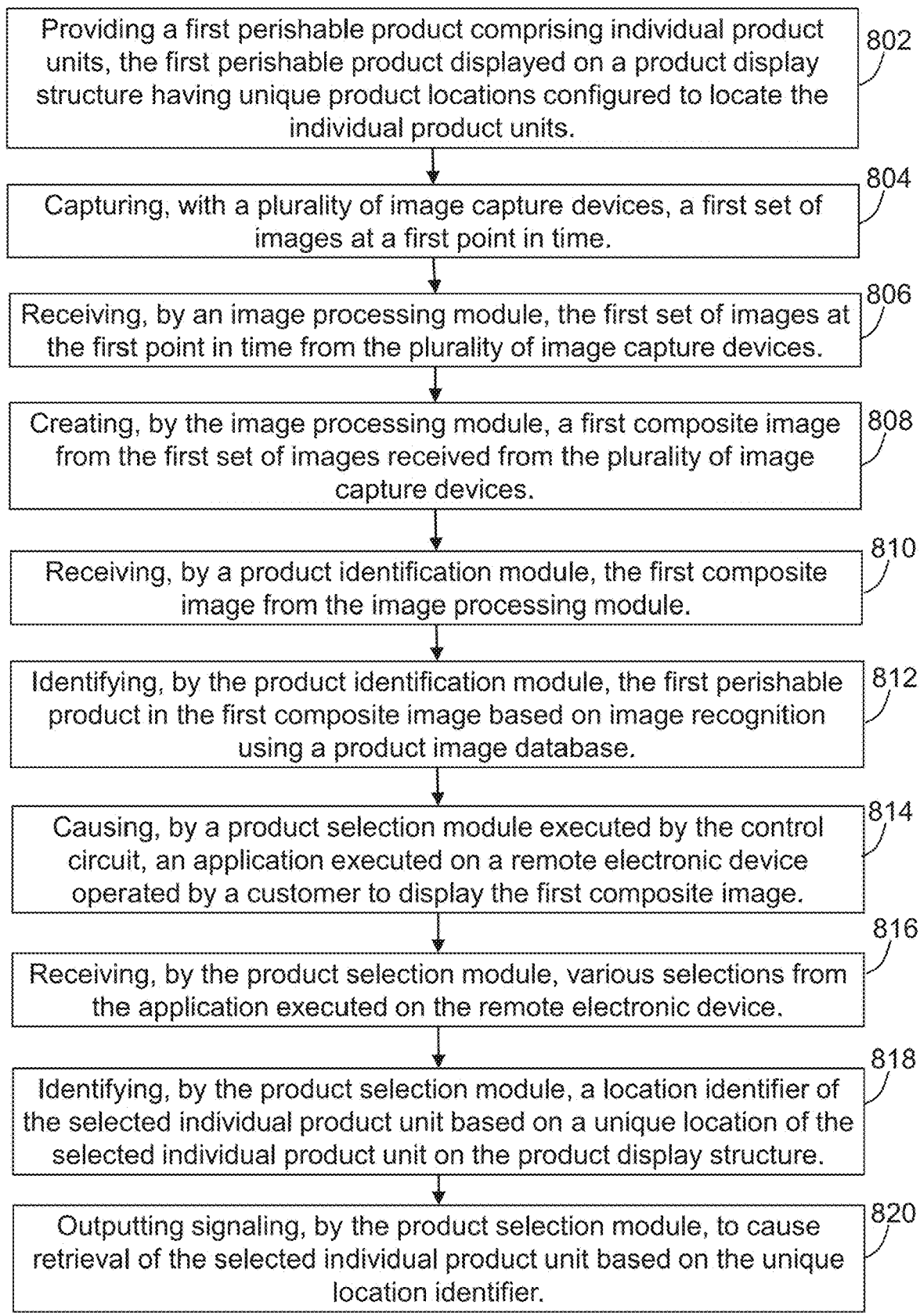

SYSTEMS AND METHODS FOR REMOTELY PURCHASING PERISHABLE PRODUCTS

CROSS-REFERENCE TO RELATED APPLICATIONS

This application claims the benefit of U.S. Provisional Application No. 63/220,723 filed on Jul. 12, 2021, and U.S. Provisional Application No. 63/220,731 filed on Jul. 12, 2021, both of which are incorporated herein by reference in their entireties.

TECHNICAL FIELD

The invention relates generally to purchasing fresh or perishable products (e.g., produce, meat, dairy etc.) from a retailer, and, more particularly, to purchasing fresh or perishable products online whereby the customer remotely views the fresh products prior to purchasing.

BACKGROUND

Online grocery shopping is becoming more common. Online grocery shopping generally involves navigating a retailer's website or shopping application and searching for products to purchase. To help customers decide which products to purchase, online retailers may provide product details describing various characteristics of the product. The customer can view the product details and make their selections. The order is then fulfilled by a store associate, who picks the products selected by the customer. For non-perishable items, such as pasta, cereal, etc., there is generally no difference between individual product items of a particular brand on the shelf. Thus, a customer can have confidence in the item selected for them by the store associate.

However, for fresh or perishable products, such as produce, meat, and dairy products, individual product items can vary significantly between one another, and customers often prefer one product characteristic over another. For example, some customers may prefer to purchase bananas that are less ripe and have a greenish color, while others may prefer to purchase ripe yellow bananas. Current online retail systems do not provide customers the flexibility to choose their fresh or perishable products, which can reduce customer satisfaction and result in customers being resistant to shopping for groceries online.

BRIEF DESCRIPTION OF THE DRAWINGS

Disclosed herein are embodiments of systems, apparatuses and methods pertaining to selecting and ordering fresh products online. This description includes drawings, wherein:

FIG. 7 is a flow diagram of a method for remotely purchasing perishable products based on selected product attributes, according to some embodiments;

FIG. 8 is a flow diagram of a method for remotely purchasing perishable products whereby a customer remotely views and selects individual product units for purchase, according to some embodiments.

Figure 1:
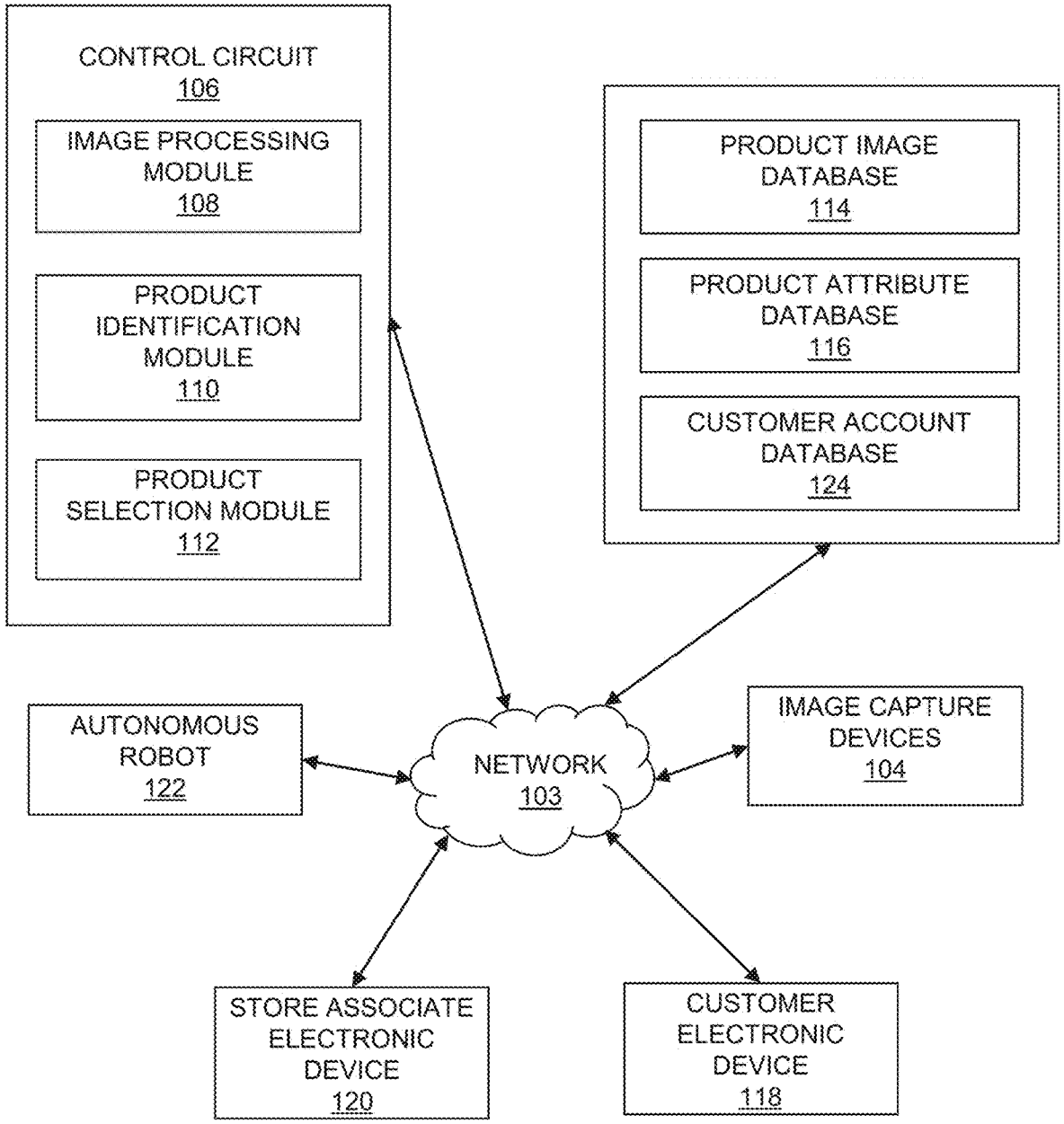
FIG. 1 is a block diagram of a system for remotely purchasing perishable products, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful for facilitating the selection and purchase of perishable products remotely from a retailer by enabling the customer to remotely view the perishable products online and to select desired product attributes of the perishable product. In some embodiments, the system identifies individual product units of the perishable product having the customer's desired product attributes and electronically marks the individual product units to be picked for the customer's purchase. This allows the customer to view the perishable products prior to purchase and to communicate desired traits of the product they would like selected for them, which gives the customer confidence in the products they have purchased. In this way, customer can view the state of perishable products prior to purchase and can communicate desired traits of the products they would like selected for them, thereby improving customer confidence and satisfaction.

In some embodiments, a system for remotely purchasing perishable products comprises a plurality of image capture devices, for example, mounted or otherwise disposed in a retail facility. The image capture devices are arranged so that they have overlapping fields of view of at least a portion of one of a plurality of perishable products. Each of the perishable products comprise a number of individual product units, which are displayed on a product display structure. The product display structure may comprise, for example, a pallet, shelving unit, or similar structure configured to display products for sale. The perishable products may comprise fresh products such as, but not limited to, fruit, vegetables, meat, fish, poultry, dairy products, bakery products, pharmaceutical products, and the like.

In some embodiments, the system further comprises a product image database containing previously obtained images of the plurality of perishable products. The system also includes a product attribute database that associates the plurality of perishable products with specific product attributes. The product attributes may comprise, for example, at least one of color, color pattern, harvest date, harvest location, remaining shelf life, freshness, size, shape, texture, and storage conditions.

In some embodiments, the system further comprises a control circuit configured to execute computer program modules and coupled to the product image database and the product attribute database. Exemplary computer program modules include, but are not limited to, an image processing module, a product identification module, and a product selection module. The control circuit is configured to execute the image processing module to receive a first set of images captured at a first point in time from the plurality of image capture devices and create a first composite image from the first set of images.

In some cases, the product identification module, when executed by the control circuit, receives the first composite image from the image processing module and identifies in the first composite image the one of the plurality of perishable products based on image and/or object recognition using the product image database. In some approaches, the product identification module is configured to segment the one of the plurality of perishable products into the individual product units therein.

In some embodiments, the product selection module, when executed by the control circuit, is configured to cause an application executed on a remote electronic device operated by a customer to display the first composite image. The application is generally configured to enable the customer to magnify at least a portion of the first composite image to allow the customer to see the products more clearly and to differentiate individual product units.

In some embodiments, the product selection module is further configured to receive, from the application executed on the remote electronic device, various customer selections including: (i) a selection identifying a perishable product to purchase from the plurality of perishable products; (ii) a selected product attribute associated with the selected perishable product; (iii) and a quantity of the individual product units for purchase from the selected perishable product having the selected product attribute. In some approaches, the control circuit is configured to store, in a customer account database, the customer's selected perishable product attributes for the plurality of perishable products. The product selection module then outputs signaling to cause retrieval of the individual product units in the selected quantity having the selected perishable product attribute to fulfill the purchase.

In some embodiments, order fulfillment can be completed by a store associate, an autonomous robot, or a combination of both. In some approaches, the product selection module is configured to cause an application executed on an in-store electronic device operated by an associate (e.g., a store associate) to display the first composite image and the individual product units therein having the selected perishable product attribute to indicate to the associate which of the individual product units to retrieve to fulfill the purchase. In other approaches, the product selection module is configured to cause an application executed on an in-store electronic device operated by an associate (e.g., a store associate) to display an augmented view of the product display, which identifies the individual product units therein having the selected perishable product attribute to indicate to the associate which of the individual product units to retrieve to fulfill the purchase.

In yet other approaches, the system further comprises an autonomous robot configured to retrieve products for purchase. In this approach, the product selection module is configured to communicate to the autonomous robot the individual product units in the first composite image having the selected perishable product attribute and instructs the robot to retrieve the individual product units in the selected quantity having the selected perishable product attribute to fulfill the purchase.

The product selection module may be further configured to label the individual product units on the first composite image as unavailable upon receiving a signal that the individual product units in the selected quantity having the selected perishable product attribute have been purchased.

The overlapping fields of view of the image capture devices may encompass or cover more than one of the plurality perishable products. For example, in some approaches the overlapping fields of view may comprise at least a portion of another of the plurality of perishable products, and the product identification module may be further configured to identify the another of the plurality of perishable products and to segment the another of the plurality of perishable products into individual product units therein.

Also described herein are systems, apparatuses and methods useful for facilitating the purchase of perishable products remotely from a retailer by enabling a customer to remotely view and select the exact product units of a particular perishable product to purchase. In this way, the customer can view the state of perishable products prior to purchase, thereby improving customer confidence and satisfaction.

In some embodiments, a system for remotely purchasing perishable products comprises a first perishable product comprising individual product units, the first perishable product displayed on a product display structure having unique product locations configured to locate the individual product units. The perishable products may comprise fresh products such as, but not limited to, fruit, vegetables, meat, fish, poultry, dairy products, bakery products, pharmaceutical products, and the like.

The product display structure may have a plurality of unique product locations configured to locate individual product units of the first perishable product. In some approaches, the product display structure may comprise, for example, a pallet, shelving unit, or similar structure configured to display products for sale. For example, the product display structure may comprise a plurality of stacked pallets, and each of the pallets may be divided into a grid (physically and/or virtually) such that each location on the grid is assigned a unique identifier.

In some embodiments, the system further incudes a plurality of image capture devices, for example, mounted or otherwise disposed in a facility (e.g., a retail facility). The image capture devices are arranged so that they have overlapping fields of view of at least a portion of a product display structure displaying the first perishable product.

In some embodiments, the system further comprises a product image database containing previously obtained images of perishable products, which may be used by the system to identify products in images captured by the image capture devices.

In some embodiments, the system further comprises a control circuit configured to execute computer program modules and coupled to the product image database. Exemplary computer program modules include, but are not limited to, an image processing module, a product identification module, and a product selection module. The control circuit is configured to execute the image processing module to receive a first set of images at a first point in time from the plurality of image capture devices. The image processing module may be further configured to create a first composite image from the first set of images received from the plurality of image capture devices, the first composite image comprising a top view of the product display structure displaying the first perishable product.

In some cases, the product identification module, when executed by the control circuit, receives the first composite image from the image processing module and identifies in the first composite image the first perishable product based on image and/or object recognition using the product image database. In some approaches, the product identification module is configured to segment the first perishable product in the first composite image into individual product units therein.

In some embodiments, the product selection module, when executed by the control circuit, is configured to cause an application executed on a remote electronic device operated by a customer to display the first composite image. The application is generally configured to enable the customer to magnify at least a portion of the first composite image to allow the customer to see the products more clearly and to differentiate individual product units.

In some embodiments, the product selection module is further configured to receive, from the application executed on the remote electronic device, a selection of the first perishable product for purchase and a selection of an individual product unit of the first perishable product for purchase. The product selection module then identifies a location identifier of the selected individual product unit based on a unique location of the selected individual product unit on the product display structure and outputs signaling to cause retrieval of the selected individual product unit based on the unique location identifier.

In some embodiments, order fulfillment can be completed by a store associate, an autonomous robot, and/or a robotic manipulator associated with the product display structure. In some approaches, the product selection module is configured to cause an application executed on an in-store electronic device operated by an associate (e.g., a store associate) to display the unique location on the product display structure of the individual product unit selected for purchase based on the unique location identifier associated with the individual product unit. In other approaches, the product selection module is configured to cause an application executed on an in-store electronic device operated by the to display an augmented view of the product display structure, which identifies the selected individual product unit therein to indicate to the associate which individual product unit to retrieve to fulfill the purchase.

In yet other approaches, the system further comprises an autonomous robot configured to retrieve products for purchase. In this approach, the product selection module is configured to communicate to the autonomous robot the unique location on the product display structure of the individual product unit selected for purchase based on the unique location identifier associated with the individual product unit and causes the autonomous robot to retrieve the individual product unit.

In some embodiments, the product selection module may be further configured to label the individual product units on the first composite image as unavailable upon receiving a signal that an individual product unit has been purchased.

The overlapping fields of view of the image capture devices may encompass or cover more than one product display structure. For example, in some approaches, the overlapping fields of view further comprise at least a portion of another product display structure displaying a second perishable product, and the product identification module is configured to identify the second perishable product and segment the second perishable product in a first composite image into individual product units therein.

In some approaches, the plurality of image capture devices may be configured to capture images at a fixed interval. The image processing module may be configured to receive a second set of images at a second point in time from the plurality of image capture devices and create a second composite image from the second set of images. The product identification module may be configured to receive the second composite image from the image processing module and identify the first perishable product based on image recognition using the product image database. The product selection module may be further configured to label the individual product unit previously purchased as unavailable on the second composite image.

In some approaches, the product display structure is multilayered and comprises at least a first layer and a second layer stacked below the first layer. The product selection module may be configured to identify from the first composite image that a threshold number of unique locations on the first layer of the product display structure are empty and to instruct an autonomous robot to remove the first layer of the product display structure to expose the second layer. In some approaches, the product selection module is further configured to communicate to the application executed on the in-store electronic device operated by a store associate an instruction instructing the associate to replenish the removed first layer of the product display structure with the first perishable product and to stack the replenished first layer below the exposed second layer. FIGS. 1 to 5 depict an exemplary system 100 for remotely purchasing perishable products. The perishable products 102 are displayed on a product display structure 105. The system includes a plurality of image capture devices 104, a control circuit 106, a product image database 114, a product attribute database 116, a customer account database 124, and an application executing on a customer electronic device 118. The system 100 may further include one or more of an application executing on a store associate's electronic device 120 and an autonomous robot 122.

The image capture devices 104 may comprise, for example, a camera or similar device configured to capture images. The image capture devices 104 may also be configured to capture locations of products within the fields of view. The image capture devices may capture images continuously, intermittently, and/or at a fixed interval (e.g., every 30 seconds, every 60 seconds, etc.). The image capture devices 104 are disposed or otherwise mounted in a facility 101 (e.g., a retail facility) in which products for sale 102 are displayed. In some approaches, the image capture devices 104 may be mounted on the sales floor. In other approaches, the image capture devices 104 may be mounted in a storage area. One or more of the image capture devices 104 may be affixed to, installed in, or otherwise mounted to the ceiling, pillars, beams, modules, display shelves, etc. of the facility 101. In other approaches, one or more of the image capture devices 104 may be associated with, for example, a robot, drone, or other autonomous vehicle. The image capture devices 104 are arranged in the facility to have fields of view covering perishable products 102 for sale in the facility, the perishable products being displayed on product display structures 105, as illustrated in FIGS. 2 to 5.

The terms "perishable products" and "fresh products" as used herein refer to products in which quality deteriorates over time due to environmental conditions. Exemplary perishable products include, but are not limited to fruit, vegetables, meat, fish, poultry, dairy products, bakery products, pharmaceutical products, and the like.

Any suitable product display structure may be used to display the perishable products 102, provided the individual units of the products 102 are visible to the image capture devices 104. Suitable product display structures 105 include, for example, uncovered pallets, crates, bins, and the like, as well as shelving units, display cases, modular, tables, racks, etc. and they may be single-layered or multi-layered as needed. In one non-limiting example, illustrated in FIGS. 2 to 5, the product display structure 105 is a multilayered pallet structure and includes three pallets (P1, P2, and P3) stacked vertically. In this configuration, the top layer of the product 102 (e.g., the P1 layer with apples) is visible to the image capture devices 104, as illustrated in FIGS. 2 to 5.

Figure 2:
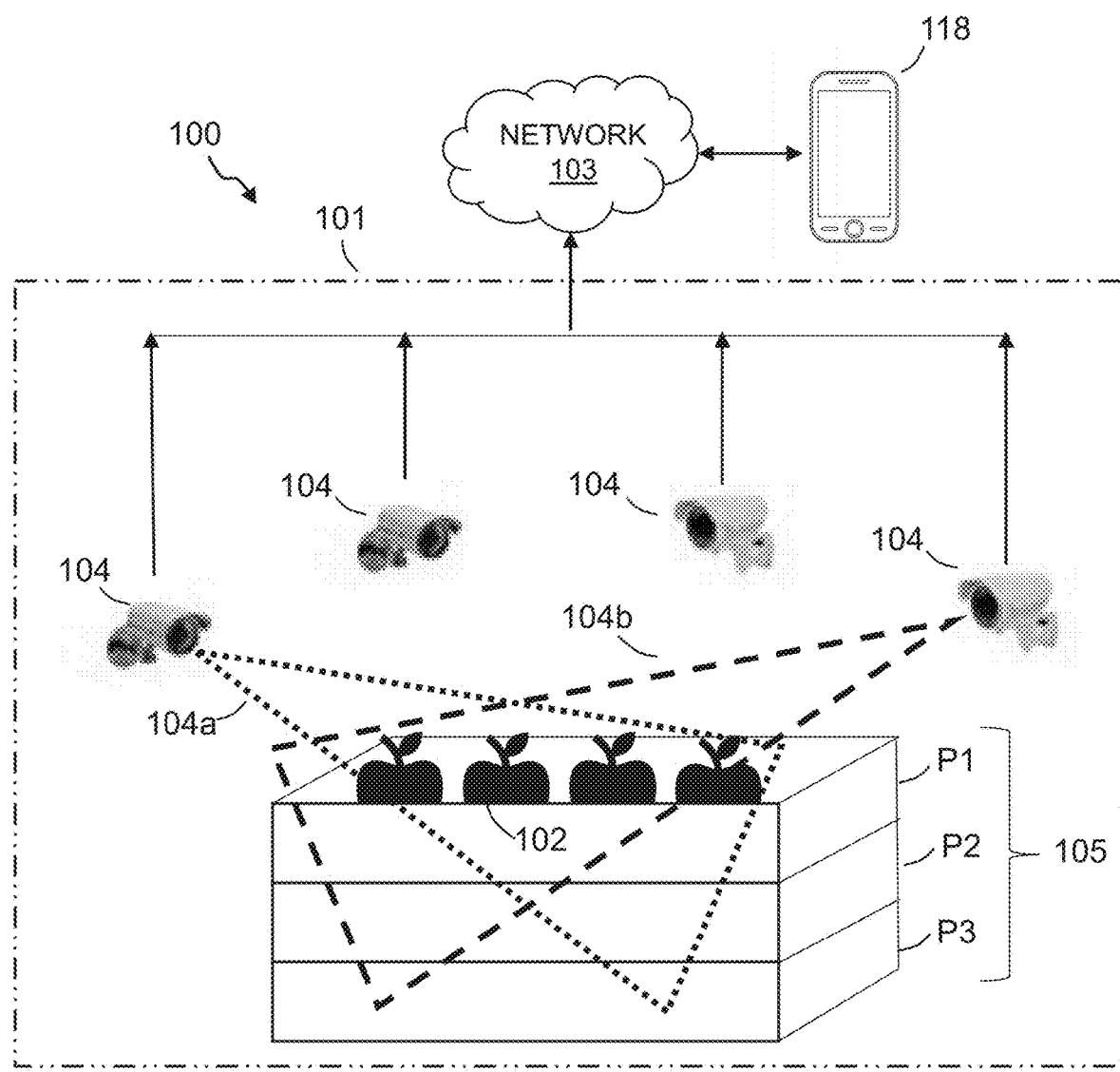
FIG. 2 depicts components of a system for remotely purchasing perishable products, according to some embodiments.

The image capture devices 104 are arranged such that at least two of the image capture devices 104 have fields of view (104a and 104b) covering a portion of the displayed product 102, for example, as illustrated in FIG. 2. This configuration allows a composite image of the product 102 to be created and then displayed via an application executing on a customer's electronic device for inspection and selection of products for purchase.

Figure 5:
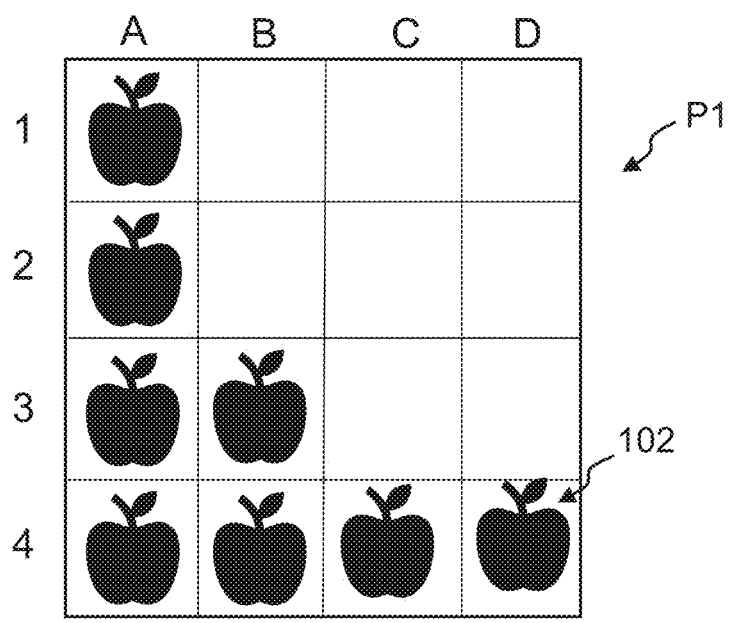
FIG. 5 depicts a top view of a product display structure for displaying perishable products, according to some embodiments.

In some approaches, each layer of the product display structure 105 may have a grid configuration (e.g., physically, virtually, etc.), as illustrated in FIG. 5, such that each section of the grid has a unique location identifier. The location identifiers for each position on the grid may be previously assigned and/or identified and stored in a database. A product may then be electronically linked to a particular product display structure (e.g., via machine readable codes, RFID tags, etc.) and individual product units assigned a unique location identifier based on each unit's position on the grid.

In some approaches, the product display structure 105 may include one or more sensors 107 configured to detect the presence product units in the grid locations. For example, each section of the grid may be fitted with such a sensor. Any suitable sensor may be used, including, but not limited to, weight sensors, optical sensors, IR sensors, proximity sensors, and/or the like. The sensors 107 may be communicable coupled to the control circuit 106 and may transit sensor data to one or more modules of the control circuit 106. In this way, the control circuit 106 may determine whether a threshold number of grid locations are empty and may initiate product replenishment as needed. In some embodiments, one or more modules of the control circuit 106 may be configured to determine, based on successive images of a particular product display structure 105, that a threshold number of grid locations are empty. The control circuit 106 may transmit an instruction a store associate's electronic device 120 and/or to an autonomous robot 122 to replenish the product display structure 105 (or one or more empty layers thereof).

Alternatively, or in addition, in some approaches, the product display structure 105 may include, or be associated with, a robotic manipulator configured to remove a first layer of a multi-layered product display structure to expose a second layer upon receiving an instruction from the control circuit 106. The robotic manipulator may be controllable, directly or indirectly, by the control circuit 106 and/or a controller 126 of the product display structure 105. The product display structure may include one or more of the components and/or functionalities of system 900 discussed below with reference to FIG. 9.

In some approaches, the product display structure 105 may include an automatic shelf upon which the product units are disposed. The automatic shelf may be controllable, directly or indirectly, by the control circuit 106 and/or the controller 126. The automatic shelf may have a movable base configured such that sections of the movable base corresponding to grid locations can be opened and closed upon receiving a signal from the product selection module 112. In this way, when a particular product unit is selected remotely by a customer and the selection is transmitted to the product selection module 112, the product selection module 112 can identify the location of the selected product unit and communicate a message to the product display structure to open the base of the shelf corresponding to the selected product unit, allowing the unit to be dropped into an appropriate compartment or container beneath the grid section. A store associate or autonomous robot may then retrieve the selected product units from the compartment or container beneath the grid section. This functionality is particularly useful in scenarios where the retail area is accessible to both online and in-person shoppers, since the purchased units are immediately removed from the shelf, thereby preventing a scenario where an in-person shopper selects particular unit after it was purchased by an online shopper but prior to the unit being picked or otherwise removed from the product display structure.

In some embodiments, the system 100 further includes a product image database 114. The product image database 114 may be populated with previously obtained images of the plurality of perishable products 102. For instance, in the example illustrated in FIGS. 2 to 5, the product image database 114 includes exemplary images of a specific variety of apple. The product image database may include exemplary images of the apple variety, for example, at varying stages of freshness. These exemplary images are used by a product identification module 110 executed by the control circuit 106 to identify images of the perishable products received from the image capture devices using image and/or object recognition techniques. The product image database 114 may be continuously updated with new and updated images of perishable products for sale in the facility, which the product identification module 110 may utilize to improve its image recognition accuracy.

In some embodiments, the system 100 further includes a product attribute database 116. The product attribute database 116 associates specific product attributes with particular perishable products 102. For example, in FIGS. 2 to 5 the perishable product 102 is an apple. The product attribute database 116 may be populated with various attributes of an apple (e.g., color, size, shape, remaining shelf life, etc.) and may associate those product attributes with that particular apple product. This allows a customer to remotely select desired product attributes of a particular perishable product using an application on their mobile device and enables the identification and selection of products having those selected product attributes, as discussed in more detail below. Exemplary product attributes may include, but are not limited to, color, color pattern, harvest date/packing date, harvest location/packing location, predicted shelf life, remaining shelf life, freshness, size, shape, texture, and storage conditions. This information, as well as additional information including, but not limited to, movement of the products and the conditions the products have been subjected to, may be tracked by the system using any suitable technology such as, for example, blockchain.

The system 100 further comprises a control circuit 106 configured to execute computer program modules, including, but not limited to, an image processing module 108, product identification module 110, and a product selection module 112. The control circuit 106 may be coupled to the image capture devices 104, the product display structure 105, the control circuit 106, the image processing module 108, the product identification module 110, the product selection module 112, the product image database 114, the product attribute database 116, the customer account database 124, the customer's electronic device 118, the store associate's electronic device 120, and/or the autonomous robot 122 via a network 103. The network 103 can be of any suitable type. For example, the network 103 can include a local area network (LAN) and/or wide area network (WAN), such as the Internet. The network can include wired and/or wireless links and all other relays, switches, transceivers, and/or networking components.

The control circuit 106 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 106 is configured (for example, by using corresponding programming as will be well understood by those skilled in the art) to carry out one or more of the steps, actions, modules, and/or functions described herein. Additionally, in some embodiments, the control circuit 106 can be implemented at a server.

By one optional approach the control circuit 106 operably couples to a memory. The memory may be integral to the control circuit 106 and/or can be physically discrete (in whole or in part) from the control circuit 106 as desired. This memory can also be local with respect to the control circuit 106 (where, for example, both share a common circuit board, chassis, power supply, and/or housing) or can be partially or wholly remote with respect to the control circuit 106 (where, for example, the memory is physically located in another facility, metropolitan area, or even country as compared to the control circuit 106).

This memory can serve, for example, to non-transitorily store the computer instructions that, when executed by the control circuit 106, cause the control circuit 106 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

As noted above, in some embodiments, the control circuit 106 is configured to execute computer program modules, including, but not limited to, an image processing module 108, and product identification module 110, and a product selection module 112. The image processing module 108 is configured to receive from the plurality of image capture devices 104 images of the perishable product 102 in the image capture device(s)' fields of view. As illustrated in FIG. 2, each image capture device may capture a portion of the displayed product 102 on the product display structure 105 in the camera's field of view (104a and 104b). The image processing module 108 is configured to filter out potentially sensitive information (including faces of customers and other potentially identifying information or features) from each camera view frame. The image processing module 108 may also filter or grey out items that have already purchased but not yet been picked.

In some embodiments, the image processing module is configured to create composite image of the product by stitching together the individual images (or view frames) received of portions of the product at a particular moment in time. Preferably, the image capture devices 104 are arranged so that all of a particular displayed product 102 (e.g., on a product display structure 105) is covered by a combined plurality of the image capture devices, and thereby the entirely of the displayed product 102 (e.g., on the product display structure 105) is represented in the composite image formed therefrom.

The image capture devices 104 may capture images continuously, intermittently, and/or at particular intervals. Preferably, the image capture devices 104 are synchronized to capture images simultaneously (or near simultaneously) such that a composite image produced from the resulting individual images accurately represents the product 102 at a particular moment in time. For example, a composite image produced from images obtained from the image capture devices at a first point in time may differ from a composite image produced from images obtained from the image capture devices at a second point in time shortly thereafter due to customers or store associates in the facility interacting with, or removing, the product. Thus, it is important that the composite image accurately reflect the state of the product 102 at a given moment in time so that customers have access to an accurate (i.e., up to date) image of the product to view.

In some embodiments, the product identification module 110, when executed by the control circuit 106, is configured to receive the composite image created by the image processing module 108 and identify the product(s) in the composite image. The product identification module 110 may use any suitable image and/or object recognition methods or techniques to identify the product(s) in the composite image (e.g., pixel to object mapping). In some approaches, the product identification module may query a product image database 114 containing stored images of known products and may compare the composite image to the stored images to identify a known product image that matches one or more products in the composite image. In some approaches, a "match" may be determined when a match score exceeds a predetermined threshold value. The product identification module stores the pixel to object mapping.

Figure 3:
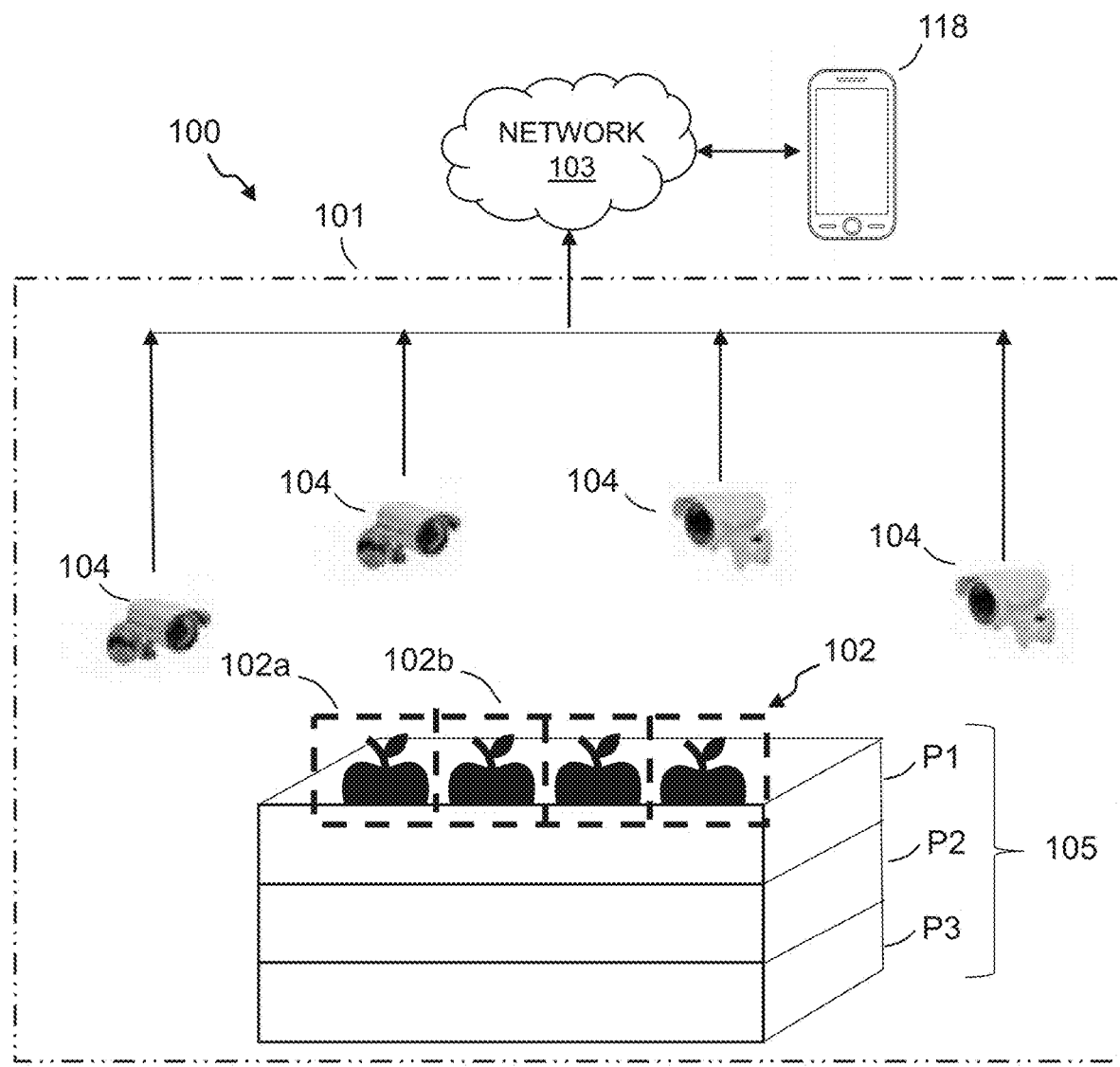
FIG. 3 depicts components of a system for remotely purchasing perishable products, according to some embodiments.
Figure 4:
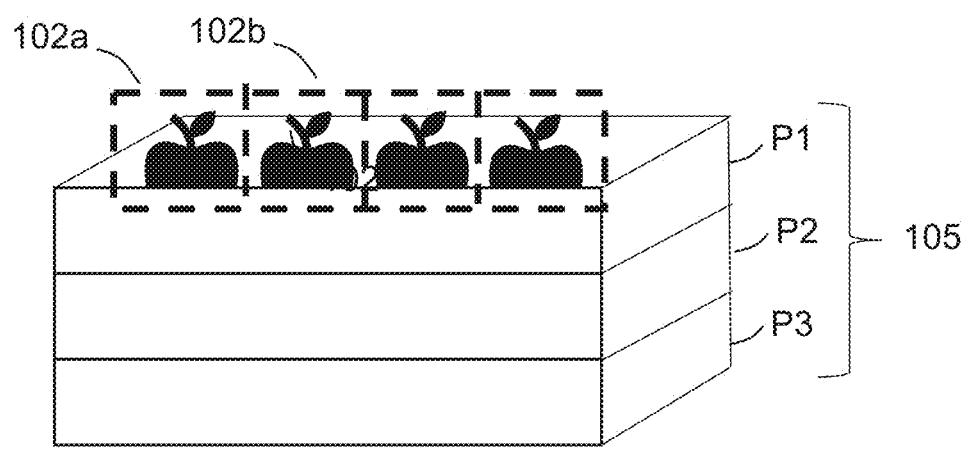
FIG. 4 depicts a product display structure for displaying perishable products, according to some embodiments.

The product identification module 110 may also be configured to segment the product into individual product units of a particular product within an image, as illustrated in FIGS. 3 to 5 (see elements 102a and 102b). Any suitable image segmentation method or technique may be used to segment products in an image into individual product units. Segmentation enables the system to map coordinates from the image of the selected unit to the actual position of the item unit in the product display. If there are multiple (i.e., different products) in the image, the product identification module may identify and segment each product in the image. Product identification and segmentation may occur prior to the composite image being formed or, in some approaches, after the composite image is formed.

In some embodiments, the product selection module 112, when executed by the control circuit 106, is configured to communicate with a remote electronic device 118 operated by a customer (also referred to herein as a "customer electronic device"). The terms "remote" and "remotely" as used herein with respect to the electronic device operated by the customer denotes is intended to convey that the electronic device when operated by the customer is capable of initiating and executing a purchase transaction from a location other than the facility in which the products for purchase are housed.

The remote electronic device may be any suitable electronic device capable of communicating via a network (e.g., network 103) to remotely execute a purchase transaction with the retailer associated with the facility 101. For example, the remote electronic device 118 may comprise a personal computer, portable computer, laptop, personal digital assistant, smartphone, tablet, or the like. The remote electronic device 118 includes a display device (e.g., a light emitting diode (LED), liquid crystal display (LCD), etc.) and a user input device (e.g., a keyboard, trackpad, number pad, etc.). In some embodiments, the display device and user input device are integrated into a single component, such as a touchscreen. The remote electronic device 118 may include one or more of the components and/or functionalities of system 900 discussed below with reference to FIG. 9.

The remote electronic device 118 is configured to execute an application, which may be affiliated or associated with the facility and/or the retailer operating the facility. The application comprises computer program code that is configured to be installed on and executed by the remote electronic device 118 (e.g., by a processor or control circuit of the remote electronic device 118. The application can be executed by the remote electronic device 118 in concert with other software modules or applications (computer program code), or groups of applications, such as operating systems, locationing applications (e.g., a mapping, GPS, etc. applications), two-factor authentication (TFA) applications, single sign on (SSO) applications, graphics processing applications, security applications, etc.

The application may be an online shopping application, which allows a customer to view and select products for purchase and to remotely execute a purchase transaction for those products. In such embodiments, the application can be a dedicated application (e.g., an application specific to a retailer or to inventory management) or a general application that while not a "dedicated application" can perform the functions as described herein with respect to remotely viewing products for purchase and initiating and executing purchase transactions. In some embodiments, the application is an add-on application installed on the remote electronic device 118 and that cooperates with other application(s) or programs of the remote electronic device 118, such as the operating system and works with the other application(s) or programs to provide the functionality described herein. In some embodiments, the add-on application is an add-on browser application that cooperates with graphical displays generated by and transmitted to the remote electronic device 118 from the control circuit 106 or other servers for display at the remote electronic device 118. In some embodiments, the application is integral with other applications of the mobile device such as the operating system. Where the application is integral with the operating system, the application may be considered a functional portion or module of the operating system, such as a browser or other dedicated functional module.

Generally, a customer initiates a shopping session by launching the application on their remote electronic device 118. The customer then searches for and selects various products for purchase. For example, in some approaches, the customer may search the name of a product, select an icon or an image of the product, or select the product from a drop-down menu. The application communicates the selection to the control circuit 106.

Figure 6A:
FIG. 6A depicts an image of a perishable product, according to some embodiments.

In some embodiments, the product selection module 112, when executed by the control circuit 106, transmits a composite image containing the selected product to the application for display by the display device of the remote electronic device 118. The application may be configured to allow the customer to magnify or zoom into the image to obtain a more detailed view of the product in the image, as illustrated in FIG. 6A. In some approaches, the composite image may comprise a short video clip of the product captured by the plurality of image capture devices 104.

Using the application, in some embodiments, the customer may select one or more product attributes associated with the product. The product attributes may comprise, for example, at least one of color, color pattern, harvest date, harvest location, remaining shelf life, freshness, size, shape, texture, and storage conditions. The product attributes are generally stored in product attribute database 116, which associates particular product attributes with the plurality of perishable products. In one approach, the application may display a list of product attributes via the display device of the remote electronic device and the customer may select a product attribute of interest from that list. For instance, for a product selection of "bananas," the application may prompt the customer to select a product attribute of "color." The customer may then be prompted to select a desired variable of the product attribute, for example, from a subsequently presented list or group of icons or images. For example, for the product attribute "color" for bananas, the customer may select an image of a greenish-colored banana, or an image of more ripe yellow banana with no green portions. In some approaches, the application may filter out individual product units that do not have the selected product attributes. The application prompts the customer to select a quantity of the product having the desired attribute.

Some customers may want to purchase amounts of particular product having different attributes (e.g., color patters, freshness dates, etc.). Thus, once the customer selects a quantity of a product having a specific attribute, the customer may be select a different attribute for that product having a different (or additional) product attribute. Once the customer has selected the desired fresh product(s) having the desired attribute(s) in the desired quantity, the customer may indicate the order is complete. The application on the customer's mobile device then sends the selections to the product selection module 112. The product selection module 112 receives from the application executed on the remote electronic device, the selection identifying the products to purchase, one or more selected product attributes for each of the products, and quantities of each product having selected product attribute(s).

Figure 6B:
FIG. 6B depicts an image of a perishable product, whereby individual product units that are selected by the system and/or by the customer are identified in the image, according to some embodiments.

In some approaches, the product selection module 112 (and/or one or more other modules executable by the control circuit 106) may identify products in the composite image having the selected product attributes using image and/or object recognition techniques. The product attributes and their variables may be visually and/or electronically associated with stored images of the product. Product attributes may be electronically associated with individual product units (or batches of product units) at various points in the supply chain (e.g., harvest/packing date, harvest location, etc.). The product selection module 112 (and/or one or more other modules executable by the control circuit 106) may be configured to match the individual units in the composite image to stored images associated with various product attributes. In some approaches, the product selection module 112 may indicate on the composite image which product units in the image have the selected product attributes, as illustrated in FIG. 6B.

In some approaches, selected product attribute(s) for the selected perishable product(s) may be stored in a customer account database 124. The product selection module 112 may also automatically identify products having the desired product attributes on the composite image for the customer when the customer views the composite image. In other approaches, the customer may select their desired product attributes each time the customer initiates an online shopping session, as desired attributes may differ from session to session.

In some embodiments, the product selection module 112 is further configured to output a signal to cause retrieval of the individual product units in the selected quantity having the selected perishable product attribute to fulfill the purchase. For example, the product selection module 112 may transmit a signal to an application executed on an in-store electronic device 120 operated by a store associate. The store associate's in-store electronic device 120 may be any suitable mobile device capable of wirelessly communicating with the control circuit 106 via network 103. In some approaches, the in-store electronic device 120 may take the form of a smartphone, tablet, portable computer, laptop computer, personal digital assistant, wearable device, eyeglasses, goggles, or media player. The in-store electronic device 120 includes an image capture device (e.g., a camera), a display device, (e.g., a light emitting diode (LED), liquid crystal display (LCD), etc. device), and a user input device (e.g., a keyboard, trackpad, number pad, touchscreen, etc.). The store associate's electronic device 120 may include one or more of the components and/or functionalities of system 900 discussed below with reference to FIG. 9.

The store associate may be alerted to the product units needing to be picked using augmented reality techniques. For example, the associate may launch an application executing on their electronic device 120 to display a real-world view of a particular product display. The application may then capture and transmit an image of the product display to the control circuit 106, which identifies individual products in the view having the selected attributes as described above. The control circuit 106 then transmits a signal to the application indicating which individual product units in the view have the selected product attributes and the application displays an augmented view of the product display indicating which product items to pick. The indications identifying the individual product units may comprise any symbol, shape, icon, or text, and may have any suitable color.

In another example, the product selection module 112 may cause the application executed on the store associate's electronic device 120 to display the composite image denoting the individual product units therein having the selected perishable product attributes, thereby indicating to the associate which of the individual product units to retrieve to fulfill the purchase order.

In some embodiments, the store associate proceeds to remove the identified items from the product display and indicates using the application on their electronic device 120 that the items have been removed. For example, in embodiments where the store associate's electronic device 120 includes a touch screen, the associate may tap on the indications identifying the items in composite image, or in the augmented view of the product display, to indicate the products have been removed. The application then transmits a signal to the control circuit 106 indicating that certain products have been removed.

In other approaches, the product selection module 112 may communicate with an autonomous robot 122 to identify the individual product units needing to be picked. The autonomous robot 122 may be any autonomous device capable of, and configured to, retrieve products for purchase in the retail facility.

In some approaches, the product selection module 112 may transmit the composite image denoting the individual product units therein having the selected perishable product attributes, thereby indicating which of the individual product units to retrieve to fulfill the purchase order. Alternatively, the autonomous robot 122 may capture and transmit an image of the product display to the control circuit 106, which identifies individual products having the selected attributes. The control circuit 106 then transmits a signal to the autonomous robot 122 robot indicating which individual product units have the selected product attributes. When the autonomous robot 122 has completed the product retrieval, the robot then transmits a signal to the control circuit 106 indicating that the product units have been removed.

Figure 6C:
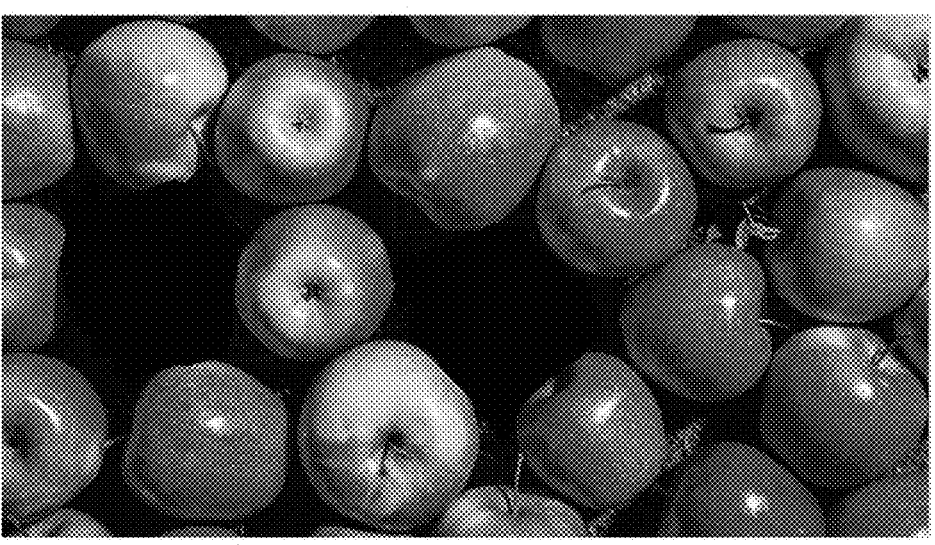
FIG. 6C depicts an image of a perishable product, whereby individual product units are marked on the image as being purchased or otherwise unavailable, according to some embodiments.

Upon receiving the signal from the store associate's electronic device 120 or the autonomous robot 122, the product selection module 112 (and/or one or more other modules executable by the control circuit 106) may update one or more inventory systems. In some approaches, the product selection module 112 may be configured to label or otherwise identify the removed product units on the composite image as unavailable, as illustrated in FIG. 6C.

In some embodiments, the customer may select the exact product unit(s) they would like to purchase (with or without the use of product attributes. The customer may initiate a shopping session by launching the application on their remote electronic device 118. The customer then searches for and selects various products for purchase. For example, in some approaches, the customer may search the name of a product, select an icon or an image of the product, or select the product from a drop-down menu. The application communicates the selection to the control circuit 106.

In some embodiments, the product selection module 112, when executed by the control circuit 106, transmits a composite image containing the selected product to the application for display by the display device of the remote electronic device 118. The application may be configured to allow the customer to magnify or zoom into the image to obtain a more detailed view of the product in the image, as illustrated in FIG. 6A. In some approaches, the composite image may comprise a short video clip of the product captured by the plurality of image capture devices 104. The customer may then select one or more individual product units for purchase, for example, by tapping, touching, or clicking on the desired units. In some approaches, the after selecting the desired product units for purchase, the customer can also view one more product attributes associated with the selected product units. The product attributes may comprise, for example, at least one of color, color pattern, harvest date, harvest location, remaining shelf life, freshness, size, shape, texture, and storage conditions. The product attributes for each product are generally stored in product attribute database 116, which associates particular product attributes with the plurality of perishable products.

In some approaches, a customer's desired product attributes may be stored in customer account database 124. The product selection module 112 may automatically identify products having the desired product attributes on the composite image displayed to the customer using image and/or object recognition techniques. For example, the product attributes and their variables may be visually and/or electronically associated with stored images of the product. Product attributes may be electronically associated with individual product units (or batches of product units) at various points in the supply chain (e.g., harvest/packing date, harvest location, etc.).

Once the customer has viewed the composite image (and, in some approaches, various product attributes), the customer selects individual product units for purchase. The application on the customer's electronic device 118 may highlight or otherwise indicate the selected units on the displayed composite image, for example as illustrated in FIG. 6B. Once the customer has selected the individual product units of each desired product for purchase, the customer may indicate the order is complete. The application on the customer's mobile device then sends the selections to the product selection module 112.

As discussed above, each product may be electronically associated with a product display structure having a grid-like configuration, such that each section of the grid has a unique location identifier. In some approaches, the product selection module 112 is configured to identify a location identifier of the product units selected by the customer based on their unique locations on the associated product display structure.

In some embodiments, the product selection module 112 is further configured to output a signal to cause retrieval of the selected individual product unit based on the unique location identifier to fulfill the purchase. For example, the product selection module 112 may transmit a signal to an application executed on an in-store electronic device 120 operated by a store associate. The store associate's in-store electronic device 120 may be any suitable mobile device capable of wirelessly communicating with the control circuit 106 via network 103. In some approaches, the in-store electronic device 120 may take the form of a smartphone, tablet, portable computer, laptop computer, personal digital assistant, wearable device, eyeglasses, goggles, or media player. The in-store electronic device 120 includes an image capture device (e.g., a camera), a display device, (e.g., a light emitting diode (LED), liquid crystal display (LCD), etc. device), and a user input device (e.g., a keyboard, trackpad, number pad, touchscreen, etc.). The store associate's electronic device 120 may include one or more of the components and/or functionalities of system 900 discussed below with reference to FIG. 9.

In some approaches, the product selection module 112 may be configured to cause the store associate's electronic device 120 to display the unique locations on the product display structure 105 of the selected product units based on the unique location identifiers associated with each selected product unit.

In some approaches, the store associate may be alerted to the selected product units needing to be picked using augmented reality techniques. For example, the associate may launch an application executing on their electronic device 120 to display a real-world view of a particular product display. The application may then capture and transmit an image of the product display structure to the control circuit 106, which identifies the selected product units in the image. The control circuit 106 then transmits a signal to the application indicating the selected product units and the application displays an augmented view of the product display structure indicating which product units to pick. The indications identifying the individual product units may comprise any symbol, shape, icon, or text, and may have any suitable color.

In another example, the product selection module 112 may cause the application executed on the store associate's electronic device 120 to display the composite image denoting the product units selected by the customer, thereby indicating to the associate which product units to retrieve to fulfill the purchase order.

In some embodiments, the store associate proceeds to remove the selected product units from the product display structure and indicates using the application on their electronic device 120 that the product units have been removed. For example, in embodiments where the store associate's electronic device 120 includes a touch screen, the associate may tap on the indications identifying the product units in composite image, or in the augmented view of the product display structure, to indicate the products have been removed. The application then transmits a signal to the control circuit 106 indicating that the product units have been removed.

In other approaches, the product selection module 112 may communicate with an autonomous robot 122 to identify the product units needing to be picked. The autonomous robot 122 may be any autonomous device capable of, and configured to, retrieve products for purchase in the facility. In some approaches, the product selection module 112 is configured to communicate to the autonomous robot 122 the unique locations on the product display structure of the selected product units based on the unique location identifiers associated with the selected product units and the product selection module 112 causes the autonomous robot 122 to retrieve the selected product units. For example, the product selection module 112 may transmit the composite image denoting the selected product units therein and/or their unique location identifiers, thereby indicating which of the individual product units to retrieve to fulfill the purchase order. Alternatively, the autonomous robot 122 may capture and transmit an image of the product display structure to the control circuit 106, which identifies the selected product units and/or their unique location identifiers. The control circuit 106 then transmits a signal to the autonomous robot 122 indicating which product units to retrieve. When the autonomous robot 122 has completed the product retrieval, the robot then transmits a signal to the control circuit 106 indicating that the product units have been removed.

Upon receiving the signal from the store associate's electronic device 120 or the autonomous robot 122, the product selection module 112 (and/or one or more other modules executable by the control circuit 106) may update one or more inventory systems. In some approaches, the product selection module 112 may be configured to label or otherwise identify the removed product units on the composite image (and any successive composite images) as unavailable, as illustrated in FIG. 6C.

In some approaches, the product selection module 112 may be configured to determine that a threshold number of grid locations on a particular product display structure are empty. As discussed above, the image capture devices 104 may capture images continuously or at particular intervals (e.g., fixed intervals). The image processing module 108 processes the images and forms a composite image. The product identification module 110 then identifies and segments the products in the image. The process may repeat for each successive group of images received, thus creating a succession of composite images having products therein identified and segmented. The product selection module 112 may compare the successive images to determine that certain grid locations of a particular product display structure are empty and may determine that the number of empty grid locations exceeds a threshold value. The product selection module 112 may then communicate with one or more modules of the control circuit 106 and/or with an inventory management system to initiate replenishment, as discussed above.

FIG. 7 depicts a simplified flow diagram of an exemplary process 700 of remotely purchasing perishable products based on selected product attributes. The process 700 may be implemented using various elements and embodiments of the system 100 described herein and other systems.

In step 702, a plurality of image capture devices captures a first set of images at a first point in time. The image capture devices may comprise, for example, a camera or similar device configured to capture images. The image capture devices may be configured to capture images continuously or at a fixed interval (e.g., every 30 seconds, every 60 seconds, etc.). The image capture devices are disposed or otherwise mounted in a facility (e.g., a retail facility) in which products for sale are displayed. In some approaches, the image capture devices may be mounted on the sales floor and/or in a storage area. One or more of the image capture devices may be affixed to, installed in, or otherwise mounted to the ceiling, pillars, beams, modules, display shelves, etc. of the facility. In other approaches, one or more of the image capture devices may be associated with, for example, a robot, drone, or other autonomous vehicle.

In some embodiments, the image capture devices are arranged in the facility to have overlapping fields of view comprising at least a portion of one of a plurality of perishable products for sale in the facility. In some approaches, the overlapping fields of view may include at least a portion of another of the plurality of perishable products. The perishable products may comprise fresh products such as, but not limited to, fruit, vegetables, meat, fish, poultry, dairy products, bakery products, pharmaceutical products, and the like. Each of the perishable products for sale comprise a plurality of individual product units, which are generally displayed on product display structures in the facility, as discussed above with reference to FIGS. 2 to 5.

In step 704, an image processing module executed by a control circuit receives the first set of images captured at the first point in time from the plurality of image capture devices.

In step 706, the image processing module creates a first composite image from the first set of images, for example, by stitching together the individual images (or view frames) received of portions of the product at a particular moment in time.

In step 708, a product identification module executed by the control circuit receives the first composite image from the image processing module.

In step 710, the product identification module identifies the one of the plurality of perishable products in the first composite image, for example, based on image and/or object recognition using a product image database. The product identification module may use any suitable image and/or object recognition methods or techniques to identify the product(s) in the composite image (e.g., pixel to object mapping). In some approaches, the product identification module may query a product image database containing stored images of known products and may compare the composite image to the stored images to identify a known product image that matches one or more products in the composite image. In some approaches, a "match" may be determined when a match score exceeds a predetermined threshold value. The product identification module is also configured to segment the product into individual product units of a particular product within an image. Any suitable image segmentation method or technique may be used to segment products in an image into individual product units. If there are multiple (i.e., different products) in the image, the product identification module may identify and segment each product in the image.

In step 712, a product selection module executed by the control circuit causes an application executed on a remote electronic device operated by a customer to display the first composite image. This allows the customer to view images (or videos) of perishable products prior to purchasing them.

In step 714, the product selection module receives various selections from the application executed on the remote electronic device, such as a selection of a perishable product to purchase from the plurality of perishable products, a selected product attribute associated with the selected perishable product, wherein the selected product attribute is stored in a product attribute database associating product attributes with the plurality of perishable products, and a quantity of the individual product units for purchase from the selected perishable product having the selected product attribute. The customer inputs these selections using their remote electronic device and the application executing on the device transmits the selections to the product selection module.

For example, a customer remote from the facility uses an electronic device, such a personal computer, portable computer, laptop, personal digital assistant, smartphone, tablet, or the like, which is executing an application, to place an order for a perishable product (e.g., fruit). In some approaches, the application may be associated with the facility. The customer, using the application, browses various perishable products and selects one particular product for purchase (e.g., ribeye steak). The application may allow the customer to magnify at least a portion of the first composite image to allow the customer to differentiate individual product units.

The application, which is communicably coupled to the control circuit, transmits the product selection to the product selection module. The customer also selects one or more product attributes the customer desires for the selected product. The product attributes may comprise, for example, at least one of color, color pattern, harvest date, harvest location, remaining shelf life, freshness, size, shape, texture, and storage conditions. The product attributes are generally stored in a product attribute database, which associates particular product attributes with the plurality of perishable products. In one approach, the application may display a list of product attributes on a user display of the customer's electronic device and the customer may select a product attribute of interest from that list. The application may then prompt the customer to select a desired variable of the product attribute, for example, from a subsequently presented list or group of icons. For instance, for a product selection of "ribeye steak," the customer may select the product attribute "color pattern." The application may then prompt the customer to select a desired color pattern from a subsequently presented list or group of icons. For example, a list may describe various degrees of marbling common in beef products, or the application may display images of icons representing varying degrees of marbling. The application may then prompt the customer to select a quantity of the product having the desired attribute. Some customers may want to purchase amounts of particular product having different attributes (e.g., color patters, freshness dates, etc.). Thus, once the customer selects a quantity of a product having a specific attribute, the customer may be select a different attribute for that product having a different (or additional) product attribute. Once the customer has selected the desired fresh product(s) having the desired attribute(s) in the desired quantity, the customer may indicate the order is complete. The application on the customer's mobile device then sends the selections to the product selection module. In some approaches, selected product attribute(s) for the selected perishable product(s) may be stored in a customer account database.

In step 716, the product selection module outputs signaling to cause retrieval of the individual product units in the selected quantity having the selected perishable product attribute to fulfill the purchase. For example, the product selection module may transmit a signal to an application executed on an in-store electronic device operated by a store associate. In some approaches, the store associate may be alerted to the product units needing to be picked using augmented reality techniques. In another example, the product selection module may cause the application executed on the store associate's electronic device to display the composite image denoting the individual product units therein having the selected perishable product attributes, thereby indicating to the associate which of the individual product units to retrieve to fulfill the purchase order. The store associate proceeds to remove the identified items from the product display and indicates using the application on their electronic device 120 that the items have been removed.

In other approaches, the product selection module may communicate with an autonomous robot to identify the individual product units needing to be picked. For example, the product selection module may transmit the composite image denoting the individual product units therein having the selected perishable product attributes, thereby indicating which of the individual product units to retrieve to fulfill the purchase order. Alternatively, autonomous robot may capture and transmit an image of the product display to the control circuit, which identifies individual products having the selected attributes as described above. The control circuit then transmits a signal to robot indicating which individual product units have the selected product attributes.

Upon receiving a signal from the store associate's electronic device or the autonomous robot, the product selection module (and/or one or more other modules executable by the control circuit) may update one or more inventory systems. The control circuit may also label or otherwise identify on the first composite image one or more individual product units as unavailable. For example, the unavailable product units in the image may be blacked out or may be overlayed with text or an icon to denote the units are unavailable.

As explained above, the image capture devices may capture images continuously or at particular intervals (e.g., fixed intervals). When the image processing module receives a second set of images captured at a second point in time from the plurality of image capture devices (e.g., 60 seconds after the first set of images captured), the image processing module creates a second composite image from the second set of images. The product identification module receives the second composite image from the image processing module and identifies perishable product(s) in the second composite image based on image and/or object recognition using the product image database. The product selection module may then compare the first composite image to the second composite image to determine that one or more individual product units present in the first image are not present in the second image, and the product selection module may label or identify those missing product units as previously purchased or otherwise unavailable on the second composite image. Thus, when a customer views the most up to date composite image of a particular product, one or more of the individual product units may be identified as unavailable.

Example 1

This example describes an end-to-end flow of an exemplary process of remotely purchasing perishable products based on selected product attributes. The process may be implemented using various elements and embodiments of the system 100 described herein and other systems.

The facility comprises a retail facility that accommodates both in-store and online shoppers and sells fresh products, such as meat, dairy, and produce. The fresh products are received by the facility and displayed for purchase. A backend system maintains and tracks all the information for each product (e.g., harvest date/packing date, the conditions that the items have been subject to, predicted remaining shelf life, place of harvest/packing, the movement of the item until present date, etc.). This information may be tracked using any suitable technology including, but not limited to, blockchain.

Multiple cameras record images or video of the fresh products the facility. The cameras are generally positioned above the fresh products so that the cameras have a clear view of the products. The cameras may have overlapping fields of view, as illustrated in FIG. 2. The cameras are configured to take continuous images, video, and/or intermittent images. The images or video are transmitted to the backend system for image processing.

The backend system filters out potentially sensitive information (including faces of customers and other potentially identifying information or features) from each camera view frame. In some approaches, the backend system may also filter or grey out items that have already purchased but not yet been picked.

Each image received from the cameras is processed by a computer vision processor. The processor identifies items in the images (e.g., apples) using object detection in the frames and stores the pixel to object mapping. When the customer selects a fresh category (e.g., fruits) or subcategory (e.g., apples), the processor identifies which frames contain those items and presents only those items to the customer. The processor also performs segmentation on the images to identify and segment the individual product units in the image. The segmentation process also enables the mapping of selected items. The camera views are stitched together and converted to single unified frame, for example, when there are multiple overlapping views.

A customer remote from the facility wishing to shop for fresh products launches an application on their electronic device (e.g., a smartphone). The application may be affiliated or associated with the retail facility. The application presents the customer with a live view (or near live view) of the fresh products section of the facility.

Using the application, the customer may browse various categories of fresh products and may view images or short videos of each fresh product or section. The customer may select a category of fresh product (e.g., apples) to see a live (or near live) feed of only that section. The backend system streams the frames for the selected product, along with the information of pixel to object mapping (and, in some approaches, the selectable units) to the customer's device. The customer may use the application to scroll, zoom in, and zoom out of the videos/images to view the products in more detail.

The customer then uses the application to select particular attributes for the product of interest (e.g., bananas with a specified shelf life). In some approaches, the application may filter or grey out all the other items and display only those which match the given criteria. The customer uses the application to select the number of items having that particular attribute for purchase and the selections are transmitted to the backend system. After the customer has completed their purchase by selecting the desired products having the desired attributes in the desired quantities, the items are billed to the customer's account.

The back system receives the customer's selections from the application and identifies which of the selected products displayed have the specified attribute by, for example, querying the information tracked for each product and/or by object detection or image recognition for visual product attributes. The backend system also determines the location of the units in the facility. The backend system then communicates an alert to a store associate to retrieve or "pick" the particular items having the specified attributes.

The store associate launches an application on their mobile device. The mobile device is equipped with a camera and a location-tracking device. The application is configured to display live and augmented views of the mobile device's field of view. When the associate launches the application, the application displays a view of the facility and tracks the current location of the associate in facility. The application receives from the backend system the locations of a product to be picked and transmits to the backend system the real-time location of the associate.

The backend system determines a route to the product's location and displays the location on the associate's mobile application. The application then guides the associate to the product. When the associate approaches the product location, the application may display an icon indicating or pointing towards the product to be picked.

As the store associate further approaches the product, the application starts capturing the individual product units in the location and the application finds the pixels in the image to which the location corresponds. The application also associates the object/unit corresponding to the pixels and highlights the individual units to be picked in that location. The store associate recognizes the units to be picked (e.g., by recognizing an icon or indication indicating the particular product units) and removes the units from the product display.

Once the units of all of the products purchased have been picked, the store associate uses the application to indicate that the order is ready for pickup. The backend system receives the indication and alerts the customer to pick up their order.

FIG. 8 depicts a simplified flow diagram of an exemplary process 800 of remotely purchasing perishable products whereby the customer can remotely view and select individual product units to purchase. The process 800 may be implemented using various elements and embodiments of the system 100 described herein and other systems.

In step 802, a first perishable product is provided. The perishable product may comprise fresh products such as, but not limited to, fruit, vegetables, meat, fish, poultry, dairy products, bakery products, pharmaceutical products, and the like. Each perishable product may comprise a plurality of individual product units. The first perishable product may be displayed on a product display structure. The product display structure may be disposed in a facility comprising perishable products for sale (e.g., a retail facility). The product display structure may have a plurality of unique product locations configured to locate individual product units of the first perishable product, as discussed above with reference to FIGS. 2 to 5.

In step 804, a plurality of image capture devices captures a first set of images at a first point in time. The image capture devices may comprise, for example, a camera or similar device configured to capture images. The image capture devices may be configured to capture images continuously or at a fixed interval (e.g., every 30 seconds, every 60 seconds, etc.). The image capture devices are disposed or otherwise mounted in the facility. In some approaches, the image capture devices may be mounted on the sales floor and/or in a storage area. One or more of the image capture devices may be affixed to, installed in, or otherwise mounted to the ceiling, pillars, beams, modules, display shelves, etc. of the facility. In other approaches, one or more of the image capture devices may be associated with, for example, a robot, drone, or other autonomous vehicle. In some embodiments, the image capture devices are arranged in the facility to have overlapping fields of view comprising at least a portion of view comprising at least a portion of the product display structure. In some approaches, the overlapping fields of view may include at least a portion of another product display structure.

In step 806, an image processing module executed by a control circuit receives the first set of images captured at the first point in time from the plurality of image capture devices.

In step 808, the image processing module creates a first composite image from the first set of images, for example, by stitching together the individual images (or view frames) received of portions of the product at a particular moment in time. In some approaches, the first composite image comprises at least a top view of the product display structure displaying the first perishable product.

In step 810, a product identification module executed by the control circuit receives the first composite image from the image processing module.

In step 812, the product identification module identifies the first perishable product in the first composite image, for example, based on image recognition using a product image database. The product identification module may use any suitable image and/or object recognition methods or techniques to identify the product(s) in the composite image (e.g., pixel to object mapping). In some approaches, the product identification module may query a product image database containing stored images of known products and may compare the composite image to the stored images to identify a known product image that matches one or more products in the composite image. In some approaches, a "match" may be determined when a match score exceeds a predetermined threshold value. The product identification module is also configured to segment the product into individual product units of a particular product within an image. Any suitable image segmentation method or technique may be used to segment products in an image into individual product units. If there are multiple (i.e., different products) in the image, the product identification module may identify and segment each product in the image.

In step 814, a product selection module executed by the control circuit causes an application executed on a remote electronic device operated by a customer to display the first composite image. This allows the customer to view images (or videos) of perishable products prior to purchasing them.

In step 816, the product selection module receives various selections from the application executed on the remote electronic device, such as a selection of the first perishable product for purchase and a selection of an individual product unit of the first perishable product for purchase. The customer inputs these selections using their remote electronic device and the application executing on the device transmits the selections to the product selection module.

For example, a customer remote from the facility uses an electronic device, such a personal computer, portable computer, laptop, personal digital assistant, smartphone, tablet, or the like, which is executing an application, to place an order for a perishable product (e.g., fruit). In some approaches, the application may be associated with the facility. The customer, using the application, browses various perishable products and selects one particular product for purchase (e.g., ribeye steak). The application may allow the customer to magnify at least a portion of the first composite image to allow the customer to differentiate individual product units. The customer may then select individual product units to purchase, for example, by tapping, touching, or clicking on the desired product unit. The application, which is communicably coupled to the control circuit, transmits the product selections to the product selection module.

In step 818, the product selection module identifies a location identifier of the selected individual product unit based on a unique location of the selected individual product unit on the product display structure, as discussed above with reference to FIG. 5.

In step 820, the product selection module outputs signaling to cause retrieval of the selected product unit based on the unique location identifier. For example, the product selection module may be configured to cause the store associate's electronic device to display the unique location on the product display structure of the product unit selected for purchase based on the unique location identifier associated the selected product unit.

In some approaches, the store associate may be alerted to the product units needing to be picked using augmented reality techniques. In another example, the product selection module may cause the application executed on the store associate's electronic device to display the composite image denoting the selected product units therein, thereby indicating to the associate which of the individual product units to retrieve to fulfill the purchase order. The store associate proceeds to remove the selected product units from the product display structure and indicates using the application on their electronic device that the product units have been removed.

In other approaches, the product selection module may communicate with an autonomous robot to identify the individual product units needing to be picked. For example, the product selection module may communicate to the autonomous robot the unique location on the product display structure of the selected product units based on the unique location identifier associated with the selected product units and the product selection module causes the autonomous robot to retrieve the selected product units. In some approaches, the product selection module may transmit to the autonomous robot the composite image denoting the selected product units therein and/or their unique location identifiers, thereby indicating which of the individual product units to retrieve to fulfill the purchase order. Alternatively, the autonomous robot may capture and transmit an image of the product display structure to the control circuit, which identifies the selected product units and/or their unique location identifiers. The control circuit then transmits a signal to the autonomous robot indicating which product units to retrieve.

Upon receiving a signal from the store associate's electronic device or the autonomous robot, the product selection module (and/or one or more other modules executable by the control circuit) may update one or more inventory systems. The control circuit may also label or otherwise identify on the first composite image one or more individual product units as unavailable. For example, the unavailable product units in the image may be blacked out or may be overlayed with text or an icon to denote the units are unavailable.

As explained above, the image capture devices may capture images continuously or at particular intervals (e.g., fixed intervals). When the image processing module receives a second set of images captured at a second point in time from the plurality of image capture devices (e.g., 60 seconds after the first set of images captured), the image processing module creates a second composite image from the second set of images. The product identification module receives the second composite image from the image processing module and identifies perishable product(s) in the second composite image based on image and/or object recognition using the product image database. The product selection module may then compare the first composite image to the second composite image to determine that one or more individual product units present in the first image are not present in the second image, and the product selection module may label or identify those missing product units as previously purchased or otherwise unavailable on the second composite image. Thus, when a customer views the most up to date composite image of a particular product, one or more of the individual product units may be identified as unavailable.

As discussed above with reference to FIGS. 2 to 5, in some approaches, the product display structure is multilayered and comprises at least a first layer and a second layer stacked below the first layer. The product selection module may be configured to identify from the first composite image that a threshold number of unique locations on the first layer of the product display structure are empty. In such a scenario, the product selection module may be configured to instruct an autonomous robot to remove the first layer of the product display structure to expose the second layer. The product selection module may also be configured to communicate to the store associate's electronic device an instruction instructing the associate to replenish the removed first layer of the product display structure with the perishable product and to stack the replenished first layer below the exposed second layer.

Example 2

This example describes an end-to-end flow of an exemplary process of remotely purchasing perishable products whereby the customer can remotely view and select individual product units to purchase. The process may be implemented using various elements and embodiments of the system 100 described herein and other systems.

The facility comprises a retail facility that accommodates both in-store and online shoppers and sells fresh products, such as meat, dairy, and produce. The fresh products are received by the facility and displayed for purchase on product display structures. A backend system maintains and tracks all the information for each product (e.g., harvest date/packing date, the conditions that the items have been subject to, predicted remaining shelf life, place of harvest/packing, the movement of the item until present date, etc.). This information may be tracked using any suitable technology including, but not limited to, blockchain.

Multiple cameras record images or video of the fresh products the facility. The cameras are generally positioned above the fresh products so that the cameras have a clear view of the products. The cameras may have overlapping fields of view, as illustrated in FIG. 2. The cameras are configured to take continuous images, video, and/or intermittent images. The images or video are transmitted to the backend system for image processing.

The backend system filters out potentially sensitive information (including faces of customers and other potentially identifying information or features) from each camera view frame. In some approaches, the backend system may also filter or grey out items that have already purchased but not yet been picked.

Each image received from the cameras is processed by a computer vision processor. The processor identifies items in the images (e.g., apples) using object detection in the frames and stores the pixel to object mapping. When the customer selects a fresh category (e.g., fruits) or subcategory (e.g., apples), the processor identifies which frames contain those items and presents only those items to the customer. The processor also performs segmentation on the images to identify and segment the individual product units in the image. The segmentation process also enables the mapping of selected items. The camera views are stitched together and converted to single unified frame, for example, when there are multiple overlapping views.

A customer remote from the facility wishing to shop for fresh products launches an application on their electronic device (e.g., a smartphone). The application may be affiliated or associated with the retail facility. The application presents the customer with a live view (or near live view) of the fresh products section of the facility.

Using the application, the customer may browse various categories of fresh products and may view images or short videos of each fresh product or section. The customer may select a category of fresh product (e.g., apples) to see a live (or near live) feed of only that section. The backend system streams the frames for the selected product, along with the information of pixel to object mapping (and, in some approaches, the selectable units) to the customer's device. The customer may use the application to scroll, zoom in, and zoom out of the videos/images to view the products in more detail. The customer selects individual product units to purchase from the units in the image, for example, by tapping, touching, or clicking on the individual units. The selected units are highlighted on the image displayed by the customer's device.

The backend system determines the locations of the selected units based on the position of the selected items on the product display structure. The backend system then communicates an alert to a store associate to retrieve or "pick" the selected product units.

The store associate launches an application on their mobile device. The mobile device is equipped with a camera and a location-tracking device. The application is configured to display live and augmented views of the mobile device's field of view. When the associate launches the application, the application displays a view of the facility and tracks the current location of the associate in facility. The application receives from the backend system the locations of a product to be picked and transmits to the backend system the real-time location of the associate.

The backend system determines a route to the product's location and displays the location on the associate's mobile application. The application then guides the associate to the product. When the associate approaches the product location, the application may display an icon indicating or pointing towards the product to be picked.

As the store associate further approaches the product, the application starts capturing the individual product units in the location and the application finds the pixels in the image to which the location corresponds. The application also associates the object/unit corresponding to the pixels and highlights the individual units to be picked in that location. The store associate recognizes the units to be picked (e.g., by recognizing an icon or indication indicating the particular product units) and removes the units from the product display. Once the units of all of the products purchased have been picked, the store associate uses the application to indicate that the order is ready for pickup. The backend system receives the indication and alerts the customer to pick up their order.

Figure 9:
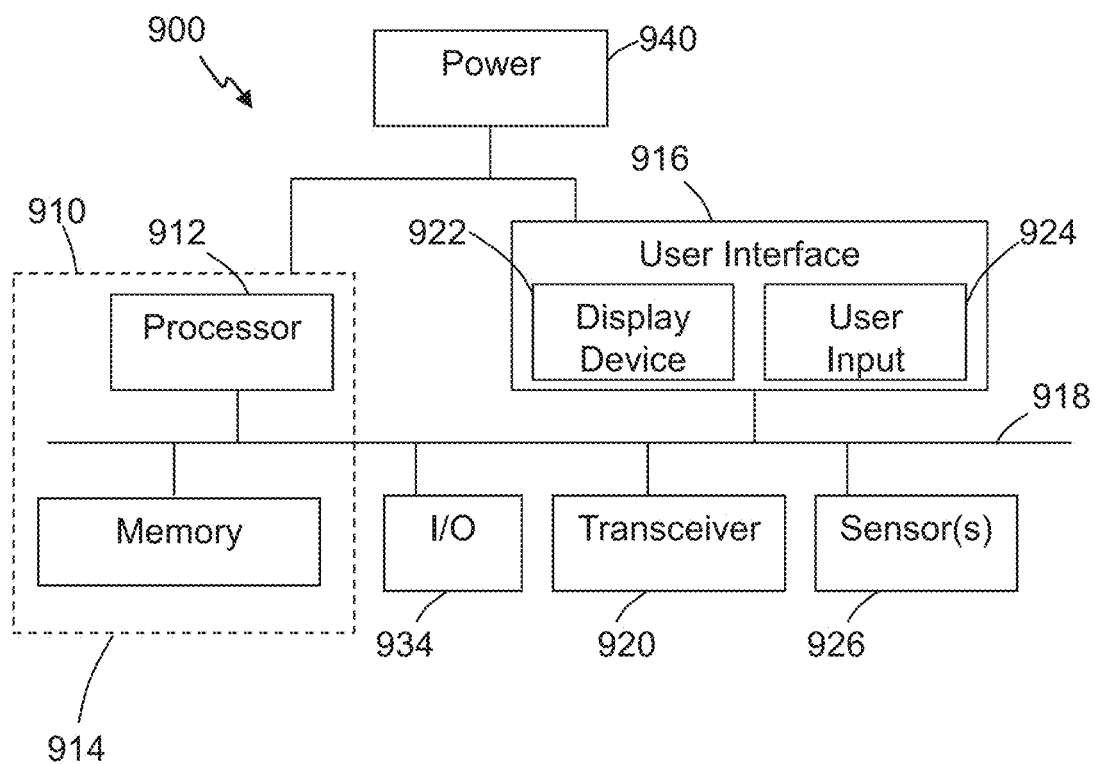
FIG. 9 is a block diagram of an exemplary system for use in implementing methods, techniques, devices, apparatuses, systems, servers, and sources for remotely purchasing perishable products, according to some embodiments.

The circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing the systems and methods illustrated in FIGS. 1 to 8, as well as any of the components, circuits, circuitry, systems, functionality, apparatuses, processes, or devices of the system 100, the image capture devices 104, the product display structure 105, the control circuit 106, the image processing module 108, the product identification module 110, the product selection module 112, the product image database 114, the product attribute database 116, the customer account database 124, the customer's electronic device 118, the store associate's electronic device 120, the autonomous robot 122, and/or other above or below mentioned systems or devices, or parts of such circuits, circuitry, functionality, systems, apparatuses, processes, or devices. However, the use of the system 900 or any portion thereof is certainly not required.

By way of example, the system 900 may comprise a control circuit or processor 912, memory 914, and one or more communication links, paths, buses or the like 918. Some embodiments may include one or more user interfaces 916, and/or one or more internal and/or external power sources or supplies 940. The processor 912 (which may form all or part of control circuit 106) can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality, processing modules, and the like. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network 918 (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as the processor or control circuit, databases, and the like. The sensors can include substantially any relevant sensor, such as distance measurement sensors (e.g., optical units, sound/ultrasound units, etc.), optical-based scanning sensors to sense and read optical patterns (e.g., bar codes, QR codes, etc.), imaging sensors, cameras, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality. The memory 914, which can be accessed by the control circuit 912, typically includes one or more processor readable and/or computer readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices (SSDs) or drives, hard disk drive (HDDs), one or more of universal serial bus (USB) stick or drive, flash memory secure digital (SD) card, other memory cards, and other such memory or combinations of two or more of such memory, and some or all of the memory may be distributed at multiple locations over a computer network. The memory 914 can store code, software, executables, scripts, data, content, lists, programming, programs, log or history data, user information, coupon information, manufacturer information, customer information, product information, and the like. While FIG. 9 illustrates the various components being coupled together via a bus, it is understood that the various components may actually be coupled to the control circuit and/or one or more other components directly.

In some embodiments, a system for remotely purchasing perishable products comprises: a plurality of image capture devices having overlapping fields of view comprising at least a portion of one of a plurality of perishable products, the one of the plurality of perishable products comprising individual product units; a product image database containing images of the plurality of perishable products; a product attribute database associating product attributes with the plurality of perishable products; a control circuit configured to execute computer program modules and coupled to the product image database and the product attribute database, wherein: the control circuit is configured to execute an image processing module to: receive a first set of images captured at a first point in time from the plurality of image capture devices; and create a first composite image from the first set of images; the control circuit is configured to execute a product identification module to: receive the first composite image from the image processing module; and identify in the first composite image the one of the plurality of perishable products based on image recognition using the product image database; the control circuit is configured to execute a product selection module to: cause an application executed on a remote electronic device operated by a customer to display the first composite image; receive, from the application executed on the remote electronic device, a selection identifying a perishable product to purchase from the plurality of perishable products, a selected product attribute associated with the selected perishable product, and a quantity of the individual product units for purchase from the selected perishable product having the selected product attribute; and output signaling to cause retrieval of the individual product units in the selected quantity having the selected perishable product attribute to fulfill the purchase.

In some embodiments, a method for remotely purchasing perishable products comprises: capturing, with a plurality of image capture devices, a first set of images at a first point in time, wherein the plurality of image capture devices have overlapping fields of view comprising at least a portion of one of a plurality of perishable products, the one of the plurality of perishable products comprising a plurality of individual product units; receiving, by an image processing module executed by a control circuit, the first set of images captured at the first point in time from the plurality of image capture devices; creating, by the image processing module, a first composite image from the first set of images; receiving, by a product identification module executed by the control circuit, the first composite image from the image processing module; identifying, by the product identification module, the one of the plurality of perishable products in the first composite image based on image recognition using a product image database, the product image database containing images of the plurality of perishable products; causing, by a product selection module executed by the control circuit, an application executed on a remote electronic device operated by a customer to display the first composite image; receiving, by the product selection module, the following selections from the application executed on the remote electronic device: a selection of a perishable product to purchase from the plurality of perishable products; a selected product attribute associated with the selected perishable product, wherein the selected product attribute is stored in a product attribute database associating product attributes with the plurality of perishable products; and a quantity of the individual product units for purchase from the selected perishable product having the selected product attribute; and outputting signaling, by the product selection module, to cause retrieval of the individual product units in the selected quantity having the selected perishable product attribute to fulfill the purchase.

In some embodiments, a system for remotely purchasing perishable products comprises: a control circuit, wherein the control circuit is configured to: capture, with a plurality of image capture devices, a first set of images at a first point in time, wherein the plurality of image capture devices have overlapping fields of view comprising at least a portion of one of a plurality of perishable products, the one of the plurality of perishable products comprising a plurality of individual product units; receive, by an image processing module executed by the control circuit, the first set of images captured at the first point in time from the plurality of image capture devices; create, by the image processing module, a first composite image from the first set of images received from the plurality of image capture devices; receive, by a product identification module executed by the control circuit, the first composite image from the image processing module; identify, by the product identification module, the one of the plurality of perishable products in the first composite image based on image recognition using a product image database, the product image database containing images of the plurality of perishable products; cause, by a product selection module executed by the control circuit, an application executed on a remote electronic device operated by a customer to display the first composite image; receive, by the product selection module, the following selections from the application executed on the remote electronic device: a selection of a perishable product to purchase from the plurality of perishable products; a selected product attribute associated with the selected perishable product, wherein the selected product attribute is stored in a product attribute database associating product attributes with the plurality of perishable products; and a quantity of the individual product units for purchase from the selected perishable product having the selected product attribute; and output signaling, by the product selection module, to cause retrieval of the individual product units in the selected quantity having the selected perishable product attribute to fulfill the purchase.

In some embodiments, a system for remotely purchasing perishable products comprises: a first perishable product comprising individual product units, the first perishable product displayed on a product display structure having unique product locations configured to locate the individual product units; a plurality of image capture devices having overlapping fields of view comprising at least a portion the product display structure; a product image database containing images of perishable products; a control circuit configured to execute computer program modules and coupled to the product image database, wherein: the control circuit is configured to execute an image processing module to: receive a first set of images at a first point in time from the plurality of image capture devices; and create a first composite image from the first set of images received from the plurality of image capture devices, the first composite image comprising a top view of the product display structure displaying the first perishable product; the control circuit is configured to execute a product identification module to: receive the first composite image from the image processing module; and identify in the first composite image the first perishable product based on image recognition using the product image database; the control circuit is configured to execute a product selection module to: cause an application executed on a remote electronic device operated by a customer to display the first composite image; receive, from the application executed on the remote electronic device, a selection of the first perishable product for purchase and a selection of an individual product unit of the first perishable product for purchase; identify a location identifier of the selected individual product unit based on a unique location of the selected individual product unit on the product display structure; and output signaling to cause retrieval of the selected individual product unit based on the unique location identifier.

In some embodiments, a method for remotely purchasing perishable products comprises: providing a first perishable product comprising individual product units, the first perishable product displayed on a product display structure having unique product locations configured to locate the individual product units; capturing, with a plurality of image capture devices, a first set of images at a first point in time, wherein the plurality of image capture devices have overlapping fields of view comprising at least a portion of the product display structure; receiving, by an image processing module, the first set of images at the first point in time from the plurality of image capture devices; creating, by the image processing module, a first composite image from the first set of images received from the plurality of image capture devices, wherein the first composite image comprises at least a top view of the product display structure displaying the first perishable product; receiving, by a product identification module, the first composite image from the image processing module; identifying, by the product identification module, the first perishable product in the first composite image based on image recognition using a product image database, the product image database containing images of perishable products; causing, by a product selection module executed by the control circuit, an application executed on a remote electronic device operated by a customer to display the first composite image; receiving, by the product selection module, the following selections from the application executed on the remote electronic device: a selection of the first perishable product for purchase; and a selection of an individual product unit of the first perishable product for purchase; identifying, by the product selection module, a location identifier of the selected individual product unit based on a unique location of the selected individual product unit on the product display structure; and outputting signaling, by the product selection module, to cause retrieval of the selected individual product unit based on the unique location identifier.

In some embodiments, a system for remotely purchasing perishable products comprises: a control circuit, wherein the control circuit is configured to: capture, with a plurality of image capture devices, a first set of images at a first point in time, wherein the plurality of image capture devices have overlapping fields of view comprising at least a portion of a product display structure, the product display structure displaying a first perishable product and having unique product locations configured to locate individual product units of the first perishable product; receive, by an image processing module, the first set of images at the first point in time from the plurality of image capture devices; create, by the image processing module, a first composite image from the first set of images received from the plurality of image capture devices, wherein the first composite image comprises at least a top view of the product display structure displaying the first perishable product; receive, by a product identification module, the first composite image from the image processing module; identify, by the product identification module, the first perishable product in the first composite image based on image recognition using a product image database, the product image database containing images of perishable products; cause, by a product selection module executed by the control circuit, an application executed on a remote electronic device operated by a customer to display the first composite image; receive, by the product selection module, the following selections from the application executed on the remote electronic device: a selection of the first perishable product for purchase; and a selection of an individual product unit of the first perishable product for purchase; identify, by the product selection module, a location identifier of the selected individual product unit based on a unique location of the selected individual product unit on the product display structure; and output signaling, by the product selection module, to cause retrieval of the selected individual product unit based on the unique location identifier.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for remotely purchasing perishable products, the system comprising:
    a plurality of image capture devices having overlapping fields of view comprising at least a portion of one of a plurality of perishable products, the one of the plurality of perishable products comprising individual product units;
    a product image database containing images of the plurality of perishable products;
    a product attribute database associating product attributes with the plurality of perishable products;
    a control circuit configured to execute computer program modules and coupled to the product image database and the product attribute database, wherein:
    the control circuit is configured to execute an image processing module to:
        receive a first set of images captured at a first point in time from the plurality of image capture devices; and
        create a first composite image from the first set of images;
    the control circuit is configured to execute a product identification module to:
        receive the first composite image from the image processing module; and
            identify in the first composite image the one of the plurality of perishable products based on image recognition using the product image database;
    the control circuit is configured to execute a product selection module to:
        cause an application executed on a remote electronic device operated by a customer to display the first composite image;
        receive, from the application executed on the remote electronic device, a selection identifying a perishable product to purchase from the plurality of perishable products, a selected product attribute associated with the selected perishable product, and a selected quantity of the individual product units for purchase from the selected perishable product having the selected product attribute;
        label the individual product units on the first composite image as unavailable upon receiving a signal that the individual product units in the selected quantity having the selected perishable product attribute have been purchased; and
        output signaling to cause retrieval of the individual product units in the selected quantity having the selected perishable product attribute to fulfill the purchase.

2. The system of claim 1, wherein the product selection module is configured to cause an application executed on an in-store electronic device operated by an associate to display the first composite image and the individual product units therein having the selected perishable product attribute to indicate to the associate which of the individual product units to retrieve to fulfill the purchase.

3. The system of claim 1, further comprising an autonomous robot configured to retrieve products for purchase, wherein the product selection module is configured to communicate to the autonomous robot the individual product units in the first composite image having the selected perishable product attribute and instruct the autonomous robot to retrieve the individual product units in the selected quantity having the selected perishable product attribute to fulfill the purchase.

4. The system of claim 1, wherein the product identification module is configured to segment the one of the plurality of perishable products into the individual product units therein.

5. The system of claim 1, wherein the overlapping fields of view further comprise at least a portion of another of the plurality of perishable products, and the product identification module is configured to identify the another of the plurality of perishable products and to segment the another of the plurality of perishable products into individual product units therein.

6. The system of claim 1, wherein:
the plurality of image capture devices are configured to capture images at a fixed interval;
the image processing module is configured to receive a second set of images captured at a second point in time from the plurality of image capture devices and create a second composite image from the second set of images;
the product identification module is configured to receive the second composite image from the image processing module and identify the one of the plurality of perishable products based on image recognition using the product image database; and
the product selection module is configured to label individual product units previously purchased as unavailable on the second composite image.

7. The system of claim 1, wherein the application executed on the remote electronic device operated by the customer is configured to enable the customer to magnify at least a portion of the first composite image to allow the customer to differentiate individual product units.

8. The system of claim 1, wherein the product attributes for the plurality of perishable products comprise at least one of color, color pattern, harvest date, harvest location, remaining shelf life, freshness, size, shape, texture, and storage conditions.

9. The system of claim 1, wherein the control circuit is configured to store, in a customer account database, the customer's selected perishable product attributes for the plurality of perishable products.

10. A method for remotely purchasing perishable products, the method comprising:
capturing, with a plurality of image capture devices, a first set of images at a first point in time, wherein the plurality of image capture devices have overlapping fields of view comprising at least a portion of one of a plurality of perishable products, the one of the plurality of perishable products comprising a plurality of individual product units;
receiving, by an image processing module executed by a control circuit, the first set of images captured at the first point in time from the plurality of image capture devices;
creating, by the image processing module, a first composite image from the first set of images;
receiving, by a product identification module executed by the control circuit, the first composite image from the image processing module;
identifying, by the product identification module, the one of the plurality of perishable products in the first composite image based on image recognition using a product image database, the product image database containing images of the plurality of perishable products;

causing, by a product selection module executed by the control circuit, an application executed on a remote electronic device operated by a customer to display the first composite image;
receiving, by the product selection module, the following selections from the application executed on the remote electronic device:
a selection of a perishable product to purchase from the plurality of perishable products;
a selected product attribute associated with the selected perishable product, wherein the selected product attribute is stored in a product attribute database associating product attributes with the plurality of perishable products;
a selected quantity of the individual product units for purchase from the selected perishable product having the selected product attribute; and
labeling the individual product units on the first composite image as unavailable upon receiving a signal that the individual product units in the selected quantity having the selected perishable product attribute have been purchased; and
outputting signaling, by the product selection module, to cause retrieval of the individual product units in the selected quantity having the selected perishable product attribute to fulfill the purchase.

11. The method of claim 10, wherein the product selection module causes an application executed on an in-store electronic device operated by an associate to display the first composite image and the individual product units therein having the selected perishable product attribute to indicate to the associate which of the individual product units to retrieve to fulfill the purchase.

12. The method of claim 10, wherein the product selection module communicates to an autonomous robot the individual product units in the first composite image having the selected perishable product attribute and instructs the autonomous robot to retrieve the individual product units in the selected quantity having the selected perishable product attribute to fulfill the purchase.

13. The method of claim 10, wherein the product identification module segments the one of the plurality of perishable products into the individual product units therein.

14. The method of claim 10, wherein the overlapping fields of view further comprise at least a portion of another of the plurality of perishable products, and the product identification module identifies the another of the plurality of perishable products and segments the another of the plurality of perishable products into individual product units therein.

15. The method of claim 10, wherein:
the plurality of image capture devices are configured to capture images at a fixed interval;
the image processing module receives a second set of images captured at a second point in time from the plurality of image capture devices and create a second composite image from the second set of images;
the product identification module receives the second composite image from the image processing module and identifies the one of the plurality of perishable products based on image recognition using the product image database; and
the product selection module labels individual product units previously purchased as unavailable on the second composite image.

16. The method of claim 10, wherein the application executed on the remote electronic device operated by the customer is configured to enable the customer to magnify at least a portion of the first composite image to allow the customer to differentiate individual product units.

17. The method of claim 10, wherein the product attributes for the plurality of perishable products comprise at least one of color, color pattern, harvest date, harvest location, remaining shelf life, freshness, size, shape, texture, and storage conditions.

18. The method of claim 10, further comprising, by the control circuit, storing in a customer account database the customer's selected perishable product attributes for the plurality of perishable products.

19. A system for remotely purchasing perishable products, the system comprising:
- a control circuit, wherein the control circuit is configured to:
  - capture, with a plurality of image capture devices, a first set of images at a first point in time, wherein the plurality of image capture devices have overlapping fields of view comprising at least a portion of one of a plurality of perishable products, the one of the plurality of perishable products comprising a plurality of individual product units;
  - receive, by an image processing module executed by the control circuit, the first set of images captured at the first point in time from the plurality of image capture devices;
  - create, by the image processing module, a first composite image from the first set of images received from the plurality of image capture devices;
  - receive, by a product identification module executed by the control circuit, the first composite image from the image processing module;
  - identify, by the product identification module, the one of the plurality of perishable products in the first composite image based on image recognition using a product image database, the product image database containing images of the plurality of perishable products;
  - cause, by a product selection module executed by the control circuit, an application executed on a remote electronic device operated by a customer to display the first composite image;
  - receive, by the product selection module, the following selections from the application executed on the remote electronic device:
    - a selection of a perishable product to purchase from the plurality of perishable products;
    - a selected product attribute associated with the selected perishable product, wherein the selected product attribute is stored in a product attribute database associating product attributes with the plurality of perishable products;
    - a selected quantity of the individual product units for purchase from the selected perishable product having the selected product attribute; and
    - labeling the individual product units on the first composite image as unavailable upon receiving a signal that the individual product units in the selected quantity having the selected perishable product attribute have been purchased; and
  - output signaling, by the product selection module, to cause retrieval of the individual product units in the selected quantity having the selected perishable product attribute to fulfill the purchase.

\* \* \* \* \*